US012647285B2

(12) United States Patent
Gollent et al.

(10) Patent No.: US 12,647,285 B2
(45) Date of Patent: Jun. 2, 2026

(54) TRANSITIONING TO AND FROM CRYPTO-AGILE HYBRID PUBLIC KEY INFRASTRUCTURES

(71) Applicant: ISARA Corporation, Waterloo (CA)

(72) Inventors: Rene Gollent, Waterloo (CA); Atsushi Yamada, Waterloo (CA); Jiayuan Sui, Burlington (CA)

(73) Assignee: ISARA Corporation, Waterloo (CA)

( * ) Notice: Subject to any disclaimer, the term of this patent is extended or adjusted under 35 U.S.C. 154(b) by 156 days.

(21) Appl. No.: 18/336,487

(22) Filed: Jun. 16, 2023

(65) Prior Publication Data

US 2023/0412397 A1 Dec. 21, 2023

Related U.S. Application Data

(60) Provisional application No. 63/417,785, filed on Oct. 20, 2022, provisional application No. 63/352,828, filed on Jun. 16, 2022.

(51) Int. Cl.
 H04L 9/00 (2022.01)
 H04L 9/32 (2006.01)
(52) U.S. Cl.
 CPC ............ H04L 9/3265 (2013.01); H04L 9/006 (2013.01)
(58) Field of Classification Search
 CPC ....... H04L 9/3265; H04L 9/006; H04L 9/007; H04L 9/0891
 See application file for complete search history.

(56) References Cited

U.S. PATENT DOCUMENTS

| | | | |
|---|---|---|---|
| 5,432,852 | A | 7/1995 | Leighton et al. |
| 7,152,158 | B2 | 12/2006 | Watanabe et al. |

(Continued)

FOREIGN PATENT DOCUMENTS

| | | |
|---|---|---|
| CA | 2657743 | 6/2009 |
| JP | 2002207427 | 7/2002 |

(Continued)

OTHER PUBLICATIONS

"European Telecommunications Standards Institute (ETSI); Quantum Safe Cryptography and Security, ETSI White Paper No. 8, France", Jun. 2015, 64 pgs.

(Continued)

*Primary Examiner* — Hany S. Gadalla
(74) *Attorney, Agent, or Firm* — Henry Patent Law Firm PLLC

(57) ABSTRACT

In a general aspect, digital certificates are generated. In some aspects, a method includes accessing a primary root certificate of a root certificate authority of a PKI system. The primary root certificate includes a first public key based on a first cryptosystem and a first signature generated with a private key that corresponds to the first public key. A secondary crypto-agile root certificate is generated. The secondary crypto-agile root certificate includes the first public key of the root certificate authority, a second public key of the root certificate authority that is based on a second cryptosystem, a second signature of the root certificate authority that is created with a second private key that corresponds to the second public key, and a third signature of the root certificate authority that is generated with the first private key. The secondary crypto-agile root certificate is propagated to subordinate entities in the PKI system.

20 Claims, 10 Drawing Sheets

(56) References Cited

U.S. PATENT DOCUMENTS

| | | | |
|---|---|---|---|
| 7,404,077 | B1 | 7/2008 | Peters et al. |
| 9,575,906 | B2 | 2/2017 | Oxford |
| 9,660,978 | B1 * | 5/2017 | Truskovsky ........ H04L 63/0823 |
| 9,794,249 | B1 | 10/2017 | Truskovsky et al. |
| 9,800,411 | B1 | 10/2017 | Brown et al. |
| 10,425,401 | B1 * | 9/2019 | Pecen ................. H04L 63/0815 |
| 10,841,295 | B1 | 11/2020 | Pecen et al. |
| 11,683,188 | B2 * | 6/2023 | Jones ................... H04L 9/3268 |
| | | | 713/157 |
| 2002/0038420 | A1 | 3/2002 | Collins et al. |
| 2002/0108041 | A1 | 8/2002 | Watanabe et al. |
| 2003/0009694 | A1 | 1/2003 | Wencour et al. |
| 2003/0041110 | A1 | 2/2003 | Wencour et al. |
| 2004/0003235 | A1 | 1/2004 | Musa |
| 2005/0005097 | A1 | 1/2005 | Murakawa |
| 2005/0144437 | A1 | 6/2005 | Ransom |
| 2008/0104401 | A1 | 5/2008 | Miyamoto et al. |
| 2009/0210703 | A1 | 8/2009 | Epstein et al. |
| 2010/0332820 | A1 | 12/2010 | Matsushima et al. |
| 2011/0055585 | A1 | 3/2011 | Lee |
| 2011/0142242 | A1 | 6/2011 | Tanaka |
| 2012/0233457 | A1 | 9/2012 | Zaverucha |
| 2012/0284508 | A1 | 11/2012 | Zaverucha |
| 2013/0097420 | A1 | 4/2013 | Zaverucha |
| 2013/0159702 | A1 | 6/2013 | Peeters |
| 2013/0246281 | A1 | 9/2013 | Yamada et al. |
| 2013/0290713 | A1 | 10/2013 | Zaverucha et al. |
| 2014/0365779 | A1 | 12/2014 | Brown et al. |
| 2015/0254451 | A1 | 9/2015 | Doane et al. |
| 2020/0028696 | A1 * | 1/2020 | Malluru ................ G06F 21/606 |
| 2021/0392002 | A1 * | 12/2021 | Gray ..................... H04L 9/3268 |
| 2022/0264300 | A1 * | 8/2022 | Nix ....................... H04L 9/3265 |

FOREIGN PATENT DOCUMENTS

| | | |
|---|---|---|
| JP | 2010-081154 | 4/2010 |
| WO | 2007048967 | 5/2007 |
| WO | 2008050792 | 5/2008 |
| WO | 2018027300 | 2/2018 |
| WO | 2020087152 | 5/2020 |

OTHER PUBLICATIONS

"Information technology—Open Systems Interconnection—The Directory: Public-key and attribute certificate frameworks", ITU-T, Series X: Data Networks, Open System Communications and Security; vol. X.509 [retrieved on Jun. 10, 2019] from http://www.itu.int/itu-t/recommendations/rec.aspx?rec=X.509, Oct. 2016, 254 pgs.

"Let's Encrypt", downloaded from https://letsencrypt.org/certificates/, Oct. 2, 2021, 5 pgs.

"RFC 7292, PKCS #12: Personal Information Exchange Syntax v1.1, IETF, 2014, 29 pages."

Bernstein, Daniel , et al., "Post-Quantum Cryptography", Springer; ISBN: 978-3-540-88701-0, 2009, 248 pages.

Buchmann , et al., "XMSS—A Practical Forward Secure Signature Scheme based on Minimal Security Assumptions", la.cr/2011/484, Nov. 2011, 23 pgs.

Cooper, et al., "Internet X.509 Public Key Infrastructure Certificate and Certificate Revocation List (CRL) Profile, Network Working Group, RFC 5280", May 2008, 151 pgs.

Huelsing , et al., "XMSS: extended Merkle Signature Scheme", Internet Research Task Force (IRTF); Request for Comments: 8391; ISSN: 2070-1721, May 2018, 74 pgs.

Mcgrew, et al., "Hash-Based Signatures, draft-mcgrew-hash-sigs-04, Crypto Forum Research Group", Mar. 21, 2016, 43 pgs.

Menezes , et al., "Chapter 10—Identification and Entity Authentication, Handbook of Applied Cryptography, CRC Press", 1997, 41 pgs.

Menezes , et al., "Chapter 11—Digital Signatures, Handbook of Applied Cryptography, CRC Press", 1997, 65 pgs.

Menezes , et al., "Chapter 4—Public Key Parameters, Handbook of Applied Cryptography, CRC Press", 1997, 37 pgs.

Moriarty , et al., "PKCS #12: Personal Information Exchange Syntax v1.1", IETF, RFC: 7292, Jul. 2014, 29 pgs.

WIPO, International Search Report and Written Opinion issued in Application No. PCT/CA2023/050836 on Jul. 4, 2023, 10 pages.

EPO, Extended European Search Report (EESR) issued in Application No. 23822581.7 on Apr. 20, 2026, 6 pages.

Akram, et al., "Securing Web Transactions TLS Server Certificate Management", National Institute of Standards and Technology, 1800-16A, Jun. 16, 2020, 200 pages.

* cited by examiner

200B

200C

200D

Certificate 162A

Certificate 162B

Certificate 164B

Certificate 166B

Certificate 168A

200E

400

Access primary root certificate of root CA — 410

Generate secondary crypto-agile root certificate — 420

Propagate the secondary crypto-agile certificate — 430

Generate new root certificate — 440

Propagate the new root certificate — 450

TRANSITIONING TO AND FROM CRYPTO-AGILE HYBRID PUBLIC KEY INFRASTRUCTURES

CROSS-REFERENCE TO RELATED APPLICATIONS

This patent application claims priority to U.S. Provisional Patent Application No. 63/352,828, filed on Jun. 16, 2022 and titled "TRANSITIONING TO AND FROM A CRYPTO-AGILE HYBRID PUBLIC KEY INFRASTRUC-TURE" and U.S. Provisional Patent Application No. 63/417,785, filed on Oct. 20, 2022 and titled TRANSITIONING TO AND FROM A CRYPTO-AGILE HYBRID PUBLIC KEY INFRASTRUCTURE". U.S. Provisional Patent Application No. 63/852,828 and U.S. Provisional Patent Application No. 63/417,785 are each incorporated herein by reference.

BACKGROUND

The following description relates to transitioning to and from crypto-agile hybrid public key infrastructures.

Cryptography systems are used to communicate securely over public channels. For example, some cryptosystems provide confidentiality by encrypting messages, and some cryptosystems provide authenticity through digital signatures. Many cryptosystems include protocols that use cryptographic keys. For example, in a public key infrastructure (PKI), the cryptographic keys include public and private keys for each entity, and a certificate authority can issue digital certificates to certify the public keys.

DETAILED DESCRIPTION

Figure 1A:
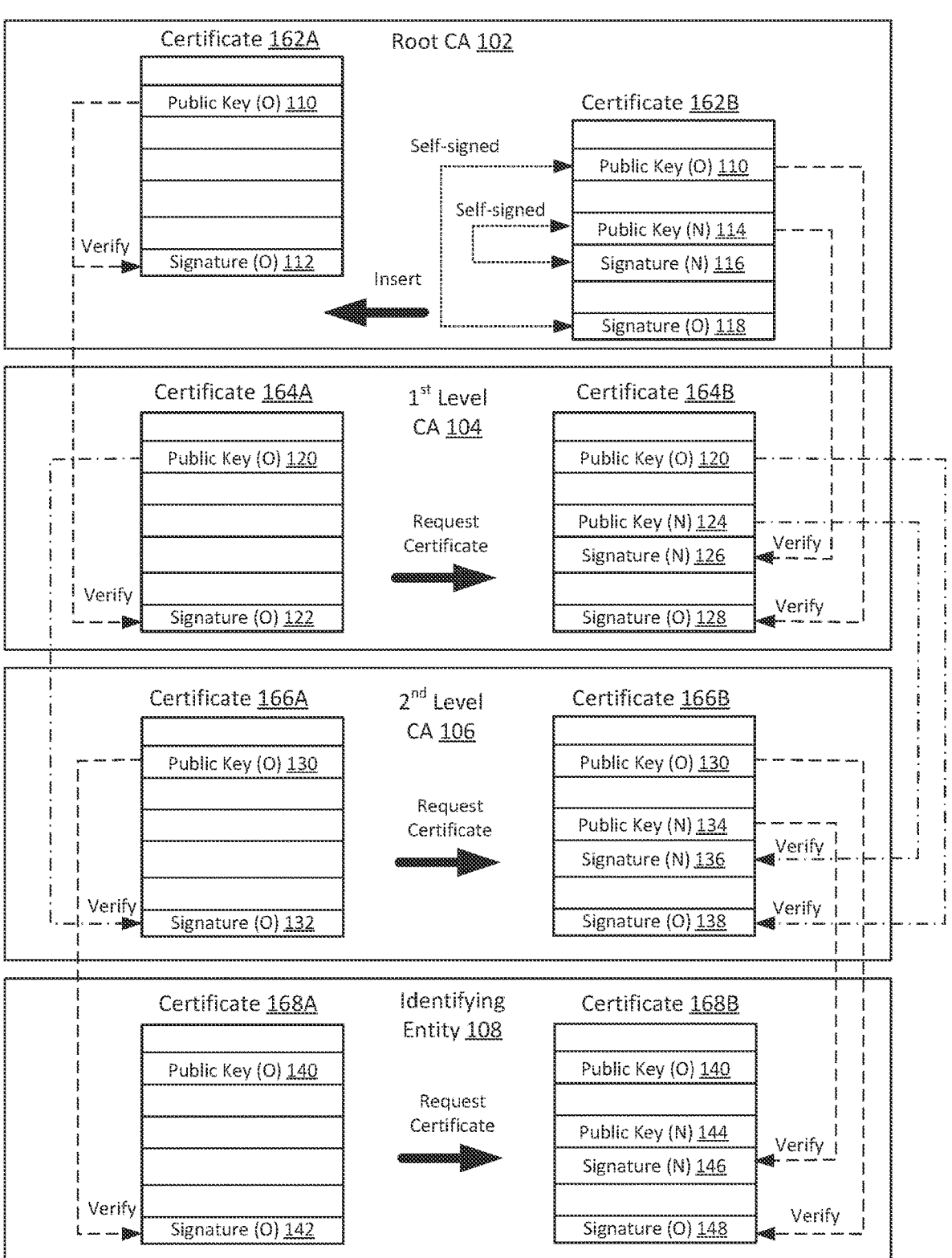
FIG. 1A is a block diagram showing aspects of an example public key infrastructure system.

In some aspects of what is described here, public key infrastructure systems are deployed and utilized in a manner that is cryptographically agile (crypto-agile). For instance, a public key infrastructure (PKI) system can be migrated from an old cryptosystem to a new cryptosystem in a secure manner. In some cases, a non-hybrid PKI system that uses an old cryptosystem can be transitioned to a crypto-agile hybrid PKI system that uses the old and new cryptosystems in parallel. In some cases, the crypto-agile hybrid PKI system can be transitioned to a new non-hybrid PKI system that utilizes only the new cryptosystem.

In some implementations, a crypto-agile hybrid PKI system can utilize crypto-agile hybrid certificates. U.S. Pat. No. 9,660,978 entitled "Using a Digital Certificate with Multiple Cryptosystems," which is hereby incorporated by reference, describes an example of crypto-agile hybrid certificates that are chained to each other (see, e.g., FIG. 6 of U.S. Pat. No. 9,660,978). For instance, the X.509 standard for digital certificates allows storing alternative public keys and signatures in the extensions of digital certificates (e.g., an alternative cryptosystem extension), which provides a tool for creating crypto-agile hybrid digital certificates. As described in U.S. Pat. No. 9,660,978, after a chain of such certificates has been established in a PKI system, the PKI system can operate with a mixture of old and new cryptosystems (e.g., achieving backwards compatibility in some cases).

Here we describe techniques and systems that can be used to convert an existing PKI system (e.g., a PKI system with non-hybrid standard certificates for an old cryptosystem) to a crypto-agile hybrid PKI system (e.g., a PKI system with a crypto-agile hybrid certificates). In some implementations, to migrate to such a state, crypto-agile hybrid certificates are gradually introduced into the existing PKI system, while maintaining continuous functionality of the PKI system (e.g., without interruption). For instance, a secondary crypto-agile hybrid certificate of the root certificate authority (CA) can be inserted into the existing certificate chain. Then, each intermediate CA can obtain a new crypto-agile hybrid certificate that replaces the intermediate CA's old certificate in the certificate chain. Such processes can provide a smooth migration to a crypto-agile hybrid PKI system.

Here we also describe techniques and systems that can be used to convert a crypto-agile hybrid PKI system to a non-hybrid PKI system (e.g., non-hybrid PKI system that uses non-hybrid standard digital certificates for the new cryptosystem). In some cases, converting to a non-hybrid PKI system completes the migration to the new cryptosystem. For instance, the non-hybrid PKI system can utilize a standard PKI tree stemming from the root certificate with a non-hybrid standard certificate format using the new cryptosystem. Transitioning to the non-hybrid PKI system may convert the crypto-agile hybrid certificate chains to a standard certificate chain where the new cryptosystem elements are in the main storage of the certificates (e.g., public key and CA signature fields). The transition to the non-hybrid PKI system includes generating a new root certificate with the new cryptosystem elements; in addition, verifying end entities may obtain the new root certificate, and identifying end entities may receive the new certificate chain stemming from the new root certificate. The propagation of these updates can take time, which can cause a mismatch between the identifying and verifying end entities. The techniques and systems described here can handle such mismatches, allowing the end entities to utilize the PKI system even when updates have not been propagated to one or both of the end entities.

Accordingly, aspects of the systems and techniques described here can be used to improve the operation of communications systems (e.g., data networks, etc.), computer systems (e.g., network-connected computers, etc.), smart devices (e.g., so-called "Internet-of-Things" (IoT) devices, etc.), and other classes of technology. For example, a wide variety of modern technologies rely on PKI systems for secure operation, and the techniques described here can improve such computer-implemented schemes, for example, making them more efficient, more secure, more cryptographically agile, more compliant with standards, or providing other advantages in some instances. In some aspects, the systems and techniques described here can provide improvements for existing schemes for migrating between cryptosystems. In some cases, the systems and techniques described here can be implemented in a manner that is less cumbersome and disruptive, for example, in a manner that does not require operating system (OS) updates to push changes onto system components. For instance, such improvements may be achieved in some cases by inserting a self-signed secondary certificate of the root CA into the existing certificate chain, so that the secondary certificate can function as a trusted anchor in the PKI system; updates may then be further propagated through the PKI system (e.g., to intermediate CAs and end entities) without interruption of service. These and other techniques described here can provide additional or different advantages and improvements in some cases.

Generally, PKI systems are widely deployed mechanisms to provide trust in public keys, so that public keys are trusted to belong to a legitimate identity. PKI systems utilize a hierarchical tree of trust stemming from a root-of-trust entity, known as a root Certificate Authority (root CA). The root CA issues a root certificate, which acts as a trust anchor for the PKI system. Such PKI systems are designed to provide assurance of the binding of a public key and an identity in the form of a digital certificate. The root CA provides assurance in the form of its certificate, referred to as a root certificate.

Because of their position at the top of the chain, root certificates can be self-signed, and consequently implicitly trusted via their addition to an application or operating system's trust store. In the case where a root certificate needs replacement, the new version needs to be propagated to all entities needing to verify the chain of trust ending with the root certificate in question, which, depending on the distribution of such entities, may require cooperation and coordination between multiple corporate entities or business units. For example, simply replacing the root certificate with one containing a new key and/or Subject Key Identifier would typically invalidate all existing subordinate certificates. As such, conventional migration processes can be cumbersome (e.g., where replacing the root certificate invalidates the entire chain of trust that depends on it). While conventional solutions such as cross-signing can partially mitigate this, such solutions may fail to provide adequate flexibility if intermediate systems and clients need to be updated to support the new system. These technical problems with conventional techniques can be solved, in some cases, by providing a transition path in which the old system remains in place and usable during the migration process.

Cryptosystems provide computational security; however, that security can degrade with the passage of time. Effective security necessitates changing the cryptosystem in anticipation of an existing cryptosystem being broken. Thus, users of a cryptosystem should take action to migrate to a new cryptosystem before the existing cryptosystem becomes obsolete or broken. The systems and techniques described here can be used to migrate to a replacement cryptosystem in a manner that ensures all nodes in the system (root CA, intermediate CAs, identifying end entities, verifying end entities) are able to support the replacement cryptosystem. For instance, the migration process can transparently replace the root certificate while retaining backwards compatibility and providing a path forward for the construction of new chains of trust, e.g., through a new cryptosystem, larger key size, or quantum-safe cryptosystem.

PKI systems have been widely deployed in a variety of contexts, including identity authentication on the Internet. In this context, PKI systems use digital certificates that are chained from the root certificate through the intermediate certificate authorities (intermediate CAs) to the identifying end entities (such as web servers, users, etc.). PKI systems use public key cryptography as the basis of security. In anticipation of an existing public key cryptosystem of a PKI system becoming obsolete, it may become necessary to increase the key size or to migrate to a different public key cryptosystem. In a typical environment, it is necessary or desirable for the PKI system to continue functioning without interruption during a migration. Conventional migration processes can be challenging because of the complexity and time required to propagate a new cryptosystem and root certificate, and then switch all the nodes of the PKI system over to the new cryptosystem. In the conventional migration process, one can construct a second PKI system using the new cryptosystem and operate the two systems in parallel during migration. However, this can require the establishment and maintenance of two independent PKI systems, which can be quite costly and error prone. Accordingly, the systems and techniques described here can provide an efficient and effective methods of implementing a cryptographic migration.

In some implementations, a migration can be achieved by generating a secondary crypto-agile, hybrid certificate of the root CA that uses the same public key as the original root certificate. By continuing to provide the existing public key, existing $1^{st}$ level intermediate CA certificates that were signed by the original root certificate can be verified by the secondary crypto-agile hybrid certificate of the root CA, allowing the certificates of the root CA to be independently updated without requiring the other components of the PKI system to be simultaneously modified. In some implementations, the CAs and end entities may install crypto-agile hybrid certificates and new cryptosystem handling capabilities asynchronously or in any order, before requesting a crypto-agile hybrid certificate. In some cases, the secondary crypto-agile hybrid certificate of the root CA is inserted between the root certificate and the certificates of the immediate (1st level) CAs in the certificate chain. Consequently, in some implementations, the new chain, which may not be completed, can be propagated to any entity in the PKI system.

The secondary crypto-agile hybrid certificate of the root CA can then be further propagated to intermediate CAs by several methods. The intermediate certificates can likewise use the same public keys as their existing certificates to maintain existing validation chains. The updated certificate chains can be subsequently propagated to end entities as leaf certificates that chain up to the secondary crypto-agile hybrid certificate of the root CA. This updated chain can be sent along with the end entity certificate when doing authentication.

After receiving the secondary crypto-agile hybrid certificate of the root CA, the verifying end entity may verify the secondary crypto-agile hybrid certificate using the original root certificate for the old cryptosystem. Then, verifying end entities can have the secondary crypto-agile hybrid certificate of the root CA pushed to their trust stores through existing mechanisms replacing the original root certificate.

In some implementations, the root CA generates a key pair for the new cryptosystem, constructs for itself the secondary crypto-agile hybrid certificate of the root CA that contains the public key of the original root certificate (e.g., in the public key field), an alternative public key and signature for the new cryptosystem in the extension (e.g., in the alternative cryptography extension), and a signature generated using the CA's original private key for the old cryptosystem (e.g., in the CA signature field). The CA's original private key that is used to generate the CA's signature corresponds to the CA's original public key in the original root certificate, such that the secondary crypto-agile hybrid certificate contains the same public key.

In some implementations, an intermediate CA then implements support for crypto-agile hybrid certificates and the new cryptosystem. The intermediate CA can then request a crypto-agile hybrid certificate from the upper level CAs, also using the old public key in the standard public key location and the public key of the new cryptosystem in the extension. The intermediate CA receives the crypto-agile hybrid certificate with the chain that includes the crypto-agile hybrid certificates of the upper CAs. These steps can then be repeated for downstream intermediate CAs until reaching the lowest level intermediate CAs.

In some implementations, end entities can implement support for crypto-agile hybrid certificates and the new cryptosystem and request a crypto-agile hybrid certificate from the lowest level CA. In some cases, the end entities receive the new crypto-agile hybrid certificate with the crypto-agile hybrid certificate chain.

In some cases, a verifying end entity (an entity that is verifying the identity of the identifying end entity) receives a new crypto-agile hybrid certificate and crypto-agile hybrid certificate chain from the identifying end entity. The verifying end entity may validate the received certificate chain using the old cryptosystem, for example, if the verifying end entity does not yet support the new cryptosystem. If the verifying end entity does support the new cryptosystem, the verifying end entity may verify the received certificate chain with the new cryptosystem. In some implementations, the verifying end entity can mark the secondary crypto-agile hybrid certificate of the root CA as trusted. In some cases, the secondary crypto-agile hybrid certificate is marked as a trusted anchor after verifying the root CA's signature in the secondary crypto-agile hybrid certificate using the public key in the original root certificate.

In some cases, the original (non-hybrid) root certificate has to be replaced with a new root certificate (e.g., if the original root certificate will soon expire, etc.), and the root certificate can be replaced in a manner specified by the PKI system. In this case, the new root certificate may be a non-hybrid root certificate.

In some implementations, an intermediate CA can request a new crypto-agile hybrid certificate if it has implemented the new cryptosystem, has implemented the handling of crypto-agile hybrid certificates, and is aware that an upper-level CA can issue a crypto-agile hybrid certificate supporting the new cryptosystem. For example, an intermediate CA can become aware that an upper-level CA can issue a crypto-agile hybrid certificate supporting the new cryptosystem by receiving a notice from the upper-level CA, by receiving an updated crypto-agile hybrid certificate chain from the upper-level CA, or by some other means.

In some implementations, the intermediate CA can request a new crypto-agile hybrid certificate from the upper-level CA. If the upper-level CA does not respond, the intermediate CA can retry the request. In some implementations, the upper-level CA may respond that it is not ready. In some implementations, the upper-level CA may send its own crypto-agile hybrid certificate chain.

In some implementations, certificate propagation can begin with the root CA notifying the $1^{st}$ level intermediate CAs that a new secondary crypto-agile hybrid certificate of the root CA is available to be inserted in the existing certificate chain. After the $1^{st}$ level intermediate CAs have been upgraded to handle crypto-agile hybrid certificates and the new cryptosystem, they can request their own crypto-agile hybrid certificates from the root CA and receive their new crypto-agile hybrid certificates along with the secondary crypto-agile hybrid certificate of the root CA to be chained from. The $1^{st}$ level intermediate CAs then notify the $2^{nd}$ level intermediate CAs that a new chain is available and, upon an appropriate upgrade of the $2^{nd}$ level intermediate CAs, provide a new chain to the $2^{nd}$ level intermediate CAs. This process can be repeated until the lowest-level intermediate CAs have received a crypto-agile hybrid certificate.

In some implementations, end entities can be upgraded to accommodate crypto-agile hybrid certificates, as well as the new cryptosystem, and the end entities can request a crypto-agile hybrid certificate and crypto-agile hybrid certificate chain that includes the secondary crypto-agile hybrid certificate of the root CA. The end entities can then use the crypto-agile hybrid certificate chain to identify themselves to verifying end entities.

In some cases, pushing down of a new certificate chain with crypto-agile hybrid certificates may occur with a chain that is only partially updated with crypto-agile hybrid certificates. In some implementations, updating an intermediate CA occurs in a particular order because a subordinate intermediate CA needs its issuer (superior) CA to sign the certificate with the new cryptosystem. Consequently, both the subordinate intermediate and issuer CAs should be equipped to handle crypto-agile hybrid certificates and the new cryptosystem. Also, since the issuer CA should have a valid and trusted private key in the new cryptosystem, with which to sign the certificate of the lower CA, the issuer CA typically needs its own crypto-agile hybrid certificate before signing. This means that the generation and deployment of the certificate should begin with the root CA, proceed level-by-level within the tree of intermediate CAs, and conclude with the end entities.

In some implementations, the installation of crypto-agile hybrid certificates and new cryptosystem handling capabilities on intermediate CAs can occur in any order or asynchronously; each intermediate CA can complete the installation before the intermediate CA requests a crypto-agile hybrid certificate from a superior CA. Some end entity systems (e.g., some smartphones, etc.) allow users to trust intermediate certificates. In some implementations, a security policy is configured such that the secondary crypto-agile hybrid certificate (of the root CA) is trusted.

In some implementations, the end entity may trust the presented crypto-agile hybrid certificate chain. For example, the end entity may validate the certificate chain up to the root certificate with the old cryptosystem. The end entity may also validate the certificate chain with the new cryptosystem up to the secondary crypto-agile hybrid certificate of the root CA. Then, a new policy may be placed to trust the secondary crypto-agile hybrid certificate of the root CA as a trusted anchor.

In some implementations, a crypto-agile hybrid PKI system allows coexistence of legacy and updated intermediate CAs and end entities in a PKI systems. In some instances, all or part of a certificate chain that extends from a crypto-agile hybrid certificate of the root CA includes one or more non-hybrid certificates that do not contain new cryptosystem elements. In some instances, all or part of a certificate chain includes crypto-agile hybrid certificates that contain new cryptosystem elements and old cryptosystem elements.

The systems and techniques described here can be implemented in a number of different environments. In some environments, full control of the PKI infrastructure is provided, such as, for example, a corporate or enterprise infrastructure, in which mediation between multiple independent entities (Certificate Authorities, browser/OS vendors, etc.) is available. In some environments, control is distributed, such as, for example, in a public PKI system (e.g., public Internet PKI tree), and the migration process is initiated by the public root CA. In some cases, a migration process can benefit from cooperation between the intermediate CAs and end entities; maintaining security of the old cryptosystem; keeping the root CA's private key uncompromised; and other measures.

In some cases, an intermediate CA can generate a new key pair of the old cryptosystem when requesting a new crypto-agile hybrid certificate. In this case, the certificates issued after this point are signed with the new private key of the old cryptosystem while the certificates issued prior to this point are signed with the old private key of the old cryptosystem. Therefore, in such a case, the intermediate CA should maintain the old certificate and maintain the old key pair because the old private key may be necessary (e.g., for typical Certificate Revocation List (CRL) and Online Certificate Status Protocol (OCSP) operations). When a typical CRL or OCSP process is executed, the intermediate CA may determine which private key of the old cryptosystem should be used. Using the old key pair for CSR to obtain the new crypto-agile hybrid certificate can result in the same public key in the new certificate. Then, for the old cryptosystem, the same key pair remains valid. Thus, the intermediate CA can delete the old certificate, simplifying the CRL or OCSP process. The old signature will remain valid.

An identifying end entity that is a certificate owner, e.g., a webserver, typically presents its certificate, along with the certificate chain, whenever it identifies itself. Thus, in some implementations, the identifying end entity can request a new crypto-agile hybrid certificate with a new key pair of the old cryptosystem. However, there may be cases that benefit from using the old key pair; for example, there are cases that allow the verifying end entity to cache the previously received certificate from the same identifying end entity.

In some instances, any certificate chain in the PKI system that stems from a root CA can remain valid at any time. Therefore, in some implementations, any intermediate CA can push down the newer certificate chain, even if intermediate CA itself does not yet have a crypto-agile hybrid certificate.

FIG. 1A is a block diagram showing aspects of an example public key infrastructure system 100. The example system 100 shown in FIG. 1A includes a root CA 102, two intermediate CAs 104, 106 and an end entity 108. In the example shown, a $1^{st}$ level intermediate CA 104 is subordinate to the root CA 102, a $2^{nd}$ level intermediate CA 106 is subordinate to the $1^{st}$ level intermediate CA 104, and the end entity 108 is subordinate to the $2^{nd}$ level intermediate CA 106. The public key infrastructure system 100 may include additional intermediate CAs at the $1^{st}$ level, additional CAs at the $2^{nd}$ level, additional end entities, or a combination of these and other features not shown in FIG. 1A.

Figure 2A:
FIGS. 2A-2E are block diagrams showing example certificate chains.
Figure 2A:
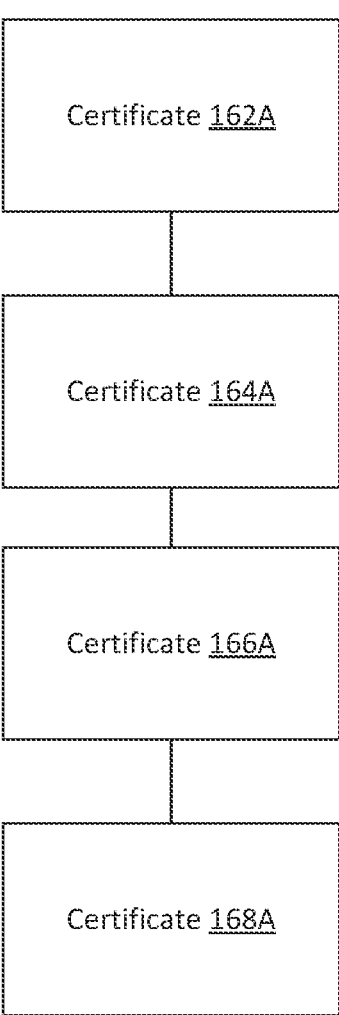

FIG. 2A is a block diagram showing an initial state of a certificate chain in the public key infrastructure system 100. As shown in FIG. 2A, the certificate chain 200A includes four certificates for an old cryptosystem—an original non-hybrid certificate 162A of the root CA 102; an original non-hybrid certificate 164A of the $1^{st}$ level intermediate CA 104; an original non-hybrid certificate 166A of the $2^{nd}$ level intermediate CA 106; and an original non-hybrid certificate 168A of the end entity 108. The old cryptosystem can be, for example, a cryptosystem that uses one or more crypto algorithms belonging to a category of weak cryptography that is being transitioned away from. FIGS. 2B, 2C, 2D, and 2E show subsequent states of the certificate chain, as crypto-agile hybrid certificates are propagated from the root CA 102 to the intermediate CAs 104, 106 and the end entity 108. In various implementations, distribution of a certificate chain includes propagating certificates of the certificate chain to lower entities beginning with a certificate below the original root certificate 162A of the root certificate authority 102. For instance, in some implementations, distribution of a certificate chain would include propagating certificates starting with a first-level intermediate certificate authority 104. The original root certificate 162A of the root certificate authority 102 is not distributed as part of the certificate chain.

In the example shown in FIG. 1A, the root CA 102 implements support for crypto-agile hybrid certificates and a new cryptosystem. The new cryptosystem can be, for example, a cryptosystem that uses one or more crypto algorithms belonging to a category of strong cryptography that is being transitioned to. In some examples, the root CA 102 increases the key size or changes to a new cryptosystem or both. An example format of digital certificates is defined in the ITU standard X.509, and examples of crypto-agile hybrid certificates are described in U.S. Pat. No. 9,660,978. The current X.509 standard for digital certificates allows storing alternative public keys and signatures (e.g., public keys and signatures for alternative cryptosystems) in extensions.

In the example shown in FIG. 1A, the original root certificate 162A for the old cryptosystem includes a public key 110 and a signature 112 generated for the old cryptosystem. The original root certificate 162A is a self-signed certificate, meaning that the root CA 102 generates the CA's signature 112 by signing the CA's public key 110 (and additional data elements) with the CA's private key that corresponds to the CA's public key 110.

In the example shown in FIG. 1A, the original root certificate 162A is a primary root certificate, and the root CA 102 creates a secondary crypto-agile hybrid certificate 162B; an extension of the secondary crypto-agile hybrid certificate 162B contains a new public key 114 and a new signature 116 for the new cryptosystem. The secondary crypto-agile hybrid certificate 162B retains the CA's old public key 110 for the old cryptosystem and a signature 118 that is created with root CA's corresponding private key for the old cryptosystem.

The secondary crypto-agile hybrid certificate 162B is a self-signed certificate, meaning that the root CA 102 generates the CA's signature 116 for the new cryptosystem by signing the CA's public key 114 for the new cryptosystem (and additional data elements) with the CA's private key (which corresponds to the CA's public key 114) for the new cryptosystem, and the root CA 102 generates the CA's signature 118 for the old cryptosystem by signing the CA's old public key 110 for the old cryptosystem (and additional data elements) with the CA's private key (which corresponds to the CA's public key 110) for the old cryptosystem. In some cases, the crypto-agile hybrid certificate 162B of the root CA 102 can be created using aspects of the processes described in U.S. Pat. No. 9,660,978, or in another manner.

In the example shown, the root CA 102 signs the secondary crypto-agile hybrid root certificate 162B with its existing private key for the old cryptosystem. As such, the secondary crypto-agile hybrid certificate 162B of the root CA 102 is self-signed by the original key pair of the old cryptosystem and has the same public key 110 as the original root certificate 162A. In the example shown, the secondary crypto-agile hybrid certificate 162B of the root CA 102 is self-signed using the new (alternative) cryptosystem, and the CA's signature 126 for the new cryptosystem is stored in the extension of the secondary crypto-agile hybrid certificate 162B. By continuing to provide the original public key 110, existing intermediate and/or end-entity certificates (164A, 166A, 168A) that were signed by the original root certificate 162A can continue to be verified by the secondary crypto-agile hybrid certificate 162B of the root CA 102.

Figure 2B:
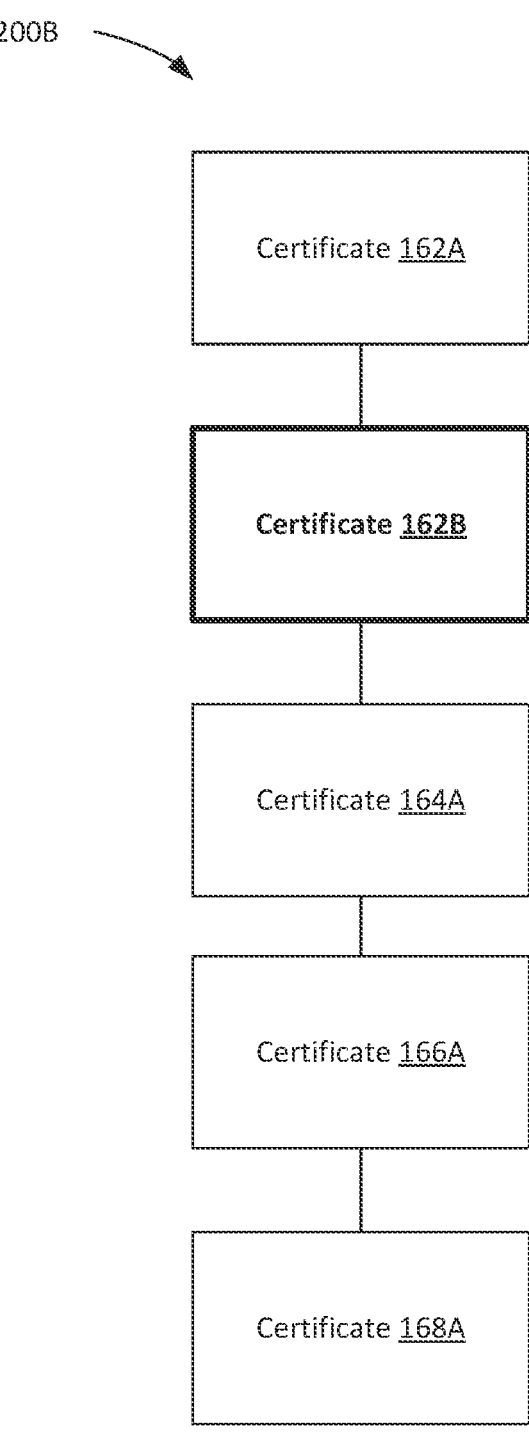

An updated certificate chain 200B containing the secondary crypto-agile hybrid certificate 162B of the root CA 102 is illustrated in FIG. 2B. As shown in FIG. 2B, the secondary crypto-agile hybrid certificate 162B of the root CA 102 is inserted in the certificate chain 200B between the original non-hybrid certificate 162A of the root CA 102 and the original non-hybrid certificate 164A of the $1^{st}$ level intermediate CA 104.

As shown in FIG. 1A, after implementing support for crypto-agile hybrid certificates and the new cryptosystem, the $1^{st}$ level intermediate CA 104 requests a new certificate from the root CA 102 and receives a new crypto-agile hybrid certificate 164B to replace its original non-hybrid certificate 164A. The $1^{st}$ level intermediate CA 104 also receives the secondary crypto-agile hybrid certificate 162B of the root CA 102 as part of the certificate chain. In some implementations, the $1^{st}$ level intermediate CA 104 may receive a notice from the root CA 102 of the issuance of crypto-agile hybrid certificates. The new crypto-agile hybrid certificate 164B includes a first public key 120 created with the old cryptosystem and a new public key 124 that is created with the new cryptosystem. The new crypto-agile hybrid certificate 164B also includes a first signature 128 that can be verified with the original public key 110 of the root CA 102 as well as a second signature 126 that can be verified with the new public key 114 of the root CA 102. In some cases, the crypto-agile hybrid certificate 164B of the $1^{st}$ level intermediate CA 104 can be created using aspects of the processes described in U.S. Pat. No. 9,660,978, or in another manner.

Figure 2C:
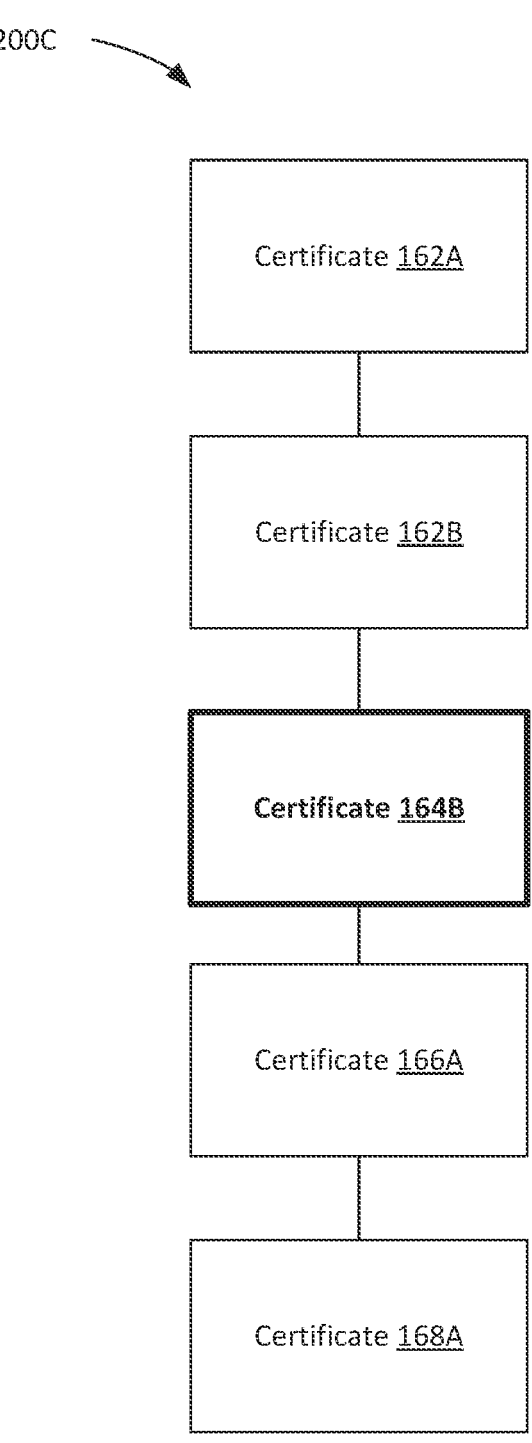

An updated certificate chain 200C containing the new crypto-agile hybrid certificate 164B of the $1^{st}$ level intermediate CA 104 is shown in FIG. 2C. As shown in FIG. 2C, the new crypto-agile hybrid certificate 164B of the $1^{st}$ level intermediate CA 104 replaces the original non-hybrid certificate 164A of the $1^{st}$ level intermediate CA 104. As such, the crypto-agile hybrid certificate 164B is between the secondary crypto-agile hybrid certificate 162B of the root CA 102 and the original non-hybrid certificate 166A in the certificate chain 200C.

As shown in FIG. 1A, after implementing support for crypto-agile hybrid certificates and the new cryptosystem, the $2^{nd}$ level intermediate CA 106 requests a new certificate from the $1^{st}$ level intermediate CA 104 and receives a new crypto-agile hybrid certificate 166B to replace its original non-hybrid certificate 166A. The $2^{nd}$ level intermediate CA 106 may also receive updated elements of the crypto-agile hybrid certificate chain, which includes the secondary crypto-agile hybrid certificate 162B of the root CA 102 and the crypto-agile hybrid certificate 164B of the $1^{st}$ level intermediate CA 104. In some implementations, the $2^{nd}$ level intermediate CA 106 may receive a notice, from the $1^{st}$ level intermediate CA 104 of the issuance of crypto-agile hybrid certificates.

As shown in FIG. 1A, the crypto-agile hybrid certificate 166B includes a first public key 130 created with the old cryptosystem and an updated public key 134 that is created with the new cryptosystem. The new crypto-agile hybrid certificate 166B also includes a first signature 138 that can be verified with the old public key 120 of the $1^{st}$ level intermediate CA 104 as well as a second signature 136 that can be verified with the new public key 124 of the $1^{st}$ level intermediate CA 104. In some cases, the crypto-agile hybrid certificate 166B of the $2^{nd}$ level intermediate CA 106 can be created using aspects of the processes described in U.S. Pat. No. 9,660,978, or in another manner.

Figure 2D:
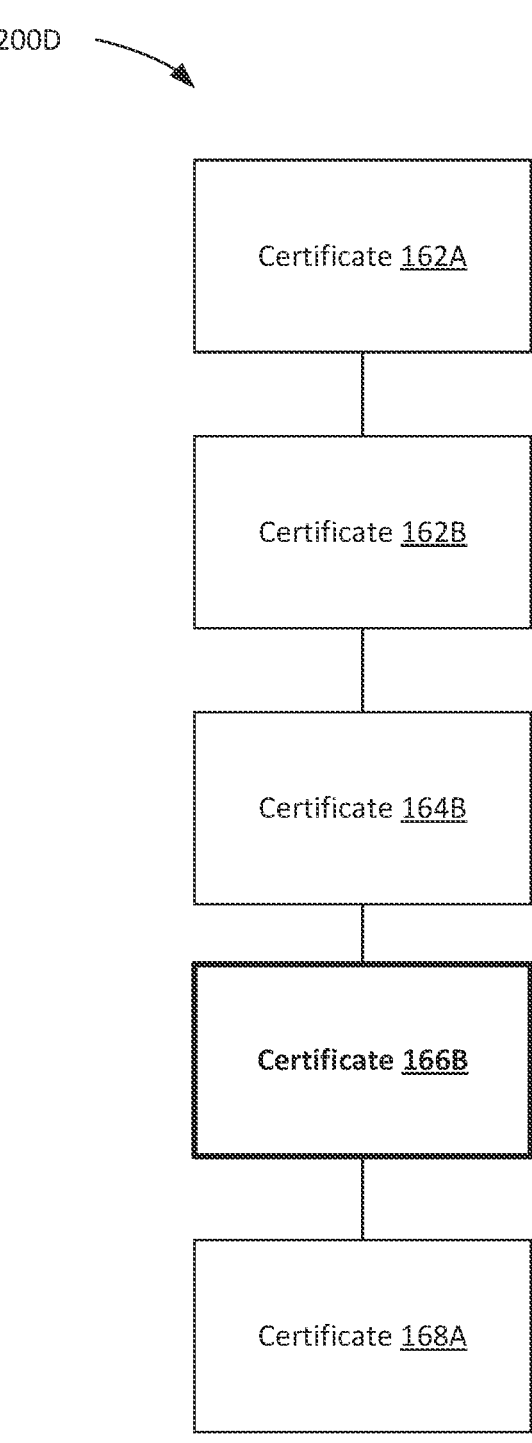

An updated certificate chain 200D containing the new crypto-agile hybrid certificate 166B of the $2^{nd}$ level intermediate CA 106 is shown in FIG. 2D. As shown in FIG. 2D, the new crypto-agile hybrid certificate 166B of the $2^{nd}$ level intermediate CA 106 replaces the original non-hybrid certificate 166A of the $2^{nd}$ level intermediate CA 106. As such, the crypto-agile hybrid certificate 166B is between the crypto-agile hybrid certificate 164B of the $1^{st}$ level intermediate CA 104 and the original non-hybrid certificate 168A of the end entity 108 in the certificate chain 200D.

As shown in FIG. 1A, after implementing support for crypto-agile hybrid certificates and the new cryptosystem, an end entity 108 (who owns the original non-hybrid certificate 168A) requests a new certificate 168B from the 2nd level intermediate CA 106 and receives a new crypto-agile hybrid certificate 168B to replace its original non-hybrid certificate 168A. In some implementations, the end entity 108 may receive a notice from the 2nd level intermediate CA 106 of the availability of a new certificate 168B. In some implementations, the identifying end entity 108 may also receive updated elements of the crypto-agile hybrid certificate chain, which includes the secondary crypto-agile hybrid certificate 162B of the root CA 102, the crypto-agile hybrid certificate 164B of the 1st level intermediate CA 104 and the crypto-agile hybrid certificate 166B of the 2nd level intermediate CA 106.

As shown in FIG. 1A, the crypto-agile hybrid certificate 168B includes a first public key 140 created with the old cryptosystem and a new public key 144 that is created with the new cryptosystem. In some instances, the public key 140 that is created with the old cryptosystem does not have to be the same as public key in the original certificate of the identifying end entity. In such instances, a new key pair for the old cryptosystem may be generated. The new crypto-agile hybrid certificate 168B also includes a first signature 148 that can be verified with the old public key 130 of the $2^{nd}$ level intermediate CA 106 as well as a second signature 146 that can be verified with the new public key 134 of the $2^{nd}$ level intermediate CA 106. In some cases, the crypto-agile hybrid certificate 168B of the end entity 108 can be created using aspects of the processes described in U.S. Pat. No. 9,660,978, or in another manner.

Figure 2E:
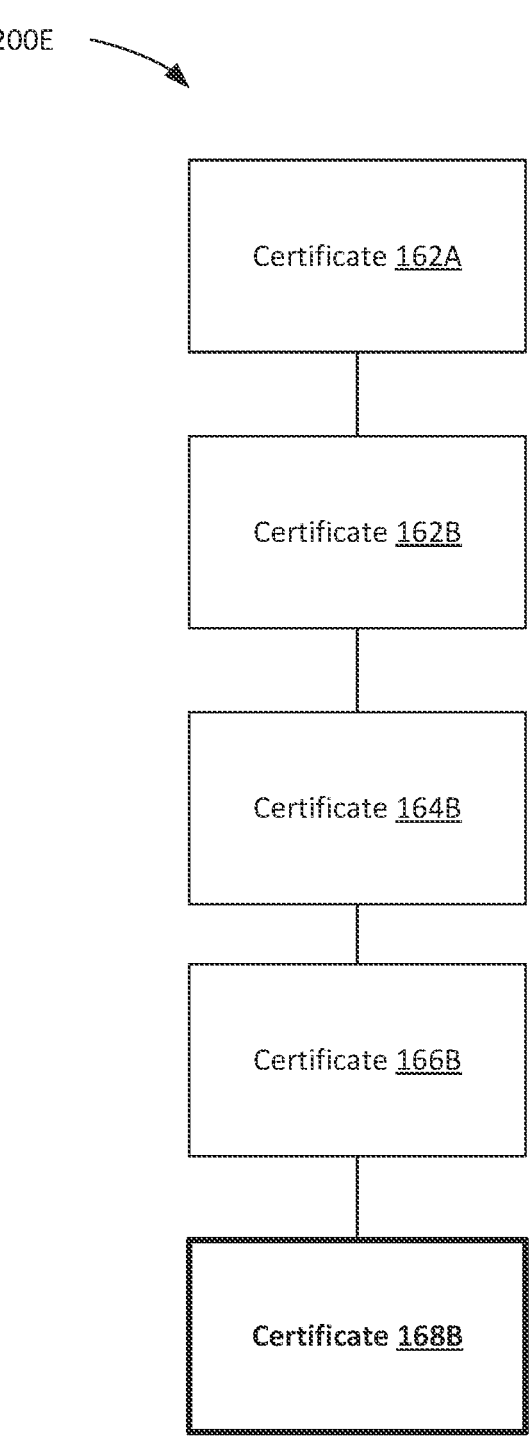

An updated certificate chain 200E containing the new crypto-agile hybrid certificate 168B of the end entity 108 is shown in FIG. 2E. As shown in FIG. 2E, the new crypto-agile hybrid certificate 168B of the end entity 108 replaces the original non-hybrid certificate 168A of the end entity 108. As such, the crypto-agile hybrid certificate 168B is below the crypto-agile hybrid certificate 166B of the $2^{nd}$ level intermediate CA 106 in the certificate chain 200E.

Figure 1B:
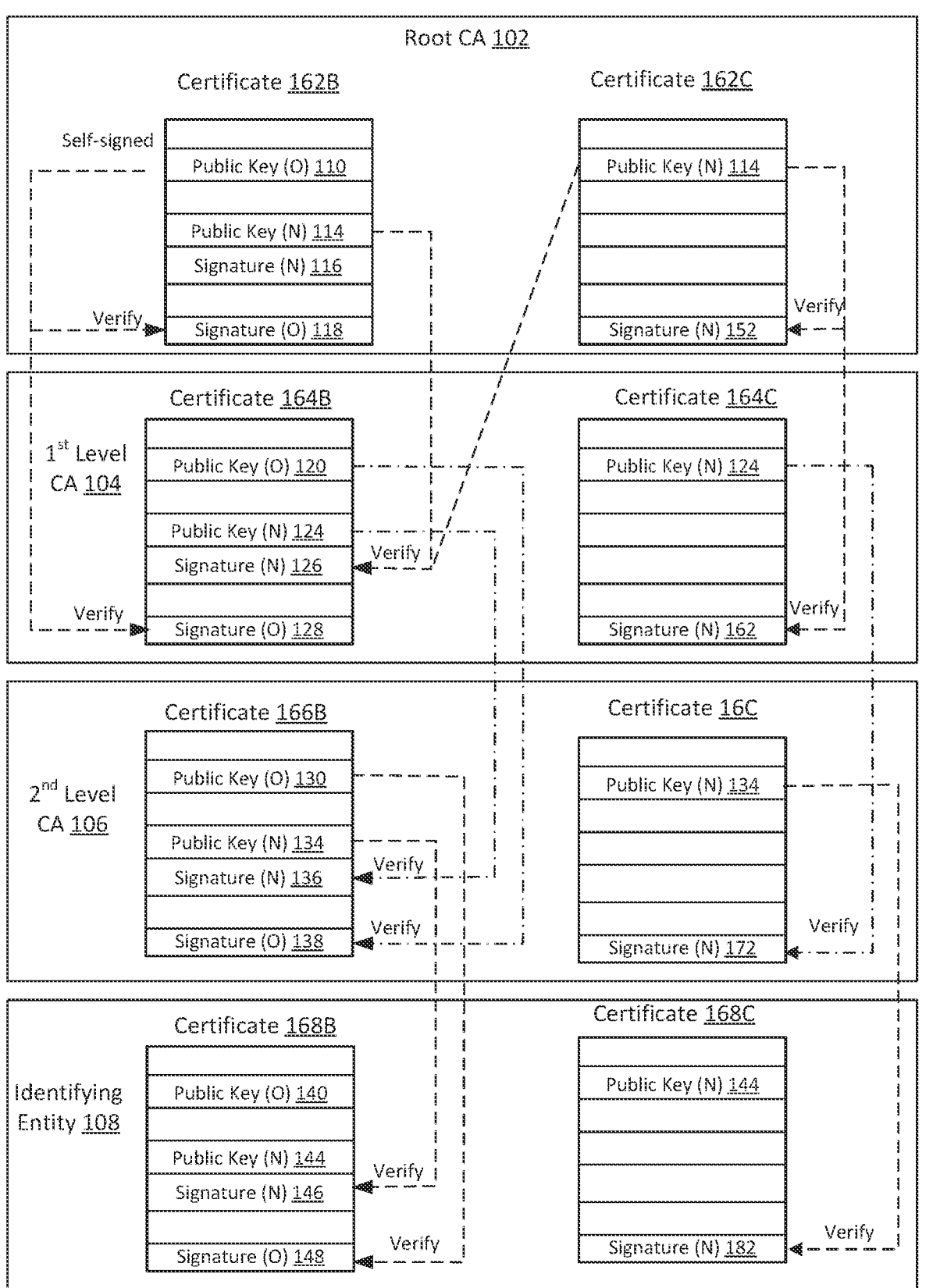
FIG. 1B is a block diagram of the example public key infrastructure system illustrating migration to a new cryptosystem.

After all or part of the certificate chain has been updated as shown in FIG. 2B, 2C, 2D or 2E, the PKI system may begin to transition from using crypto-agile hybrid certificates (which contain elements of the old cryptosystem and the new cryptosystem) to using non-hybrid certificates that contain elements only for the new cryptosystem. For instance, as shown in FIG. 1B, the PKI system 100 can transition from crypto-agile hybrid certificates to standard non-hybrid certificates for the new cryptosystem (e.g., standard non-hybrid X.509 certificates, or another type) after some or all the verifying end entities have received the crypto-agile hybrid certificate chain and have used the new cryptosystem to validate certificate chains.

For such a transition, a new root certificate 162C for the new cryptosystem can be created and distributed to the verifying end entities. The new non-hybrid root certificate 162C includes the public key 114 from the crypto-agile hybrid certificate 162B. The new non-hybrid root certificate 162C is self signed and includes a signature 152 generated with the private key corresponding to the public key 114. As shown in FIG. 1B, the 1st level intermediate CA 104 may request a new non-hybrid certificate 164C. In some implementations, the new non-hybrid certificate 164C includes the public key 124 from the crypto-agile hybrid certificate 164B. In other embodiments, the new non-hybrid certificate 164C may include a public key that is different from the public key 124 from the crypto-agile hybrid certificate 164B. The new non-hybrid certificate 164C includes a signature 162 that is generated with the private key that corresponds to the public key 114 of the root CA. Similarly, the $2^{nd}$ level intermediate CA 106 may request a new non-hybrid certificate 166C. In some implementations, the new non-hybrid certificate 166C includes the public key 134 from the crypto-agile hybrid certificate 166B. In other embodiments, the new non-hybrid certificate 166C may include a public key that is different from the crypto-agile hybrid certificate 166B. The new non-hybrid certificate 166C includes a signature 172 that is generated with the private key that corresponds to the public key of the 1st level intermediate CA 104. In various embodiments, the public key of the 1st level intermediate CA 104 may be the public key 124 from the crypto-agile hybrid certificate 164B or a different public key. The identifying end entity 108 may request a new non-hybrid certificate 168C. In some implementations, the new non-hybrid certificate 168C includes the public key 144 from the crypto-agile hybrid certificate 168B. In other embodiments, the new non-hybrid certificate 168C may include a public key that is different from the crypto-agile hybrid certificate 168B The new non-hybrid certificate 168C includes a signature 182 that is generated with the private key that corresponds to the public key of the 2nd level intermediate CA 106. In various embodiments, the public key of the 2nd level intermediate CA 106 may be the public key 134 from the crypto-agile hybrid certificate 168B or a different public key.

In a large PKI system, it is not easy to distribute the new root certificate 162C to all the verifying end entities at the same time. In the meantime, the identifying end entities 108 obtain a new certificate chain stemming from the new non-hybrid root certificate 162C for the new cryptosystem. Thus, the following mismatches between the identifying end entities and the verifying end entities can happen: (1) A verifying end entity is still using the old root certificate (e.g., certificate 162A in FIG. 1A) while the identifying end entity sends a new certificate chain for the new cryptosystem; or (2) A verifying end entity has the new root certificate (e.g., certificate 162C in FIG. 1B) for the new cryptosystem, but receives a crypto-agile hybrid certificate chain from the identifying end entity 108. Accordingly, mechanisms to handle such mismatches are provided.

To be able to issue a crypto-agile hybrid certificate, a CA may install resources for the new cryptosystem and resources for handling of crypto-agile hybrid certificates. An entity such as, for example, an intermediate CA or an identifying end entity, cannot obtain a hybrid certificate unless the issuer (superior) CA becomes capable of issuing hybrid certificates. Typically, it will be most effective and natural if the new cryptosystem and crypto-agile hybrid certificate handling capabilities are installed from the Root CA down to the identifying end entity. The capabilities can be installed to the CAs and identifying end entities in any order. However, the issuance of the hybrid certificate occurs from the Root CA down. Due to this, the only form of the hybrid and non-hybrid mixed certificate chain is to have hybrid certificates on the top part and non-hybrid certificates with old cryptosystem elements on the lower part. Thus, in a migration from a non-hybrid certificate chain with old cryptosystem elements to a hybrid certificate chain, the identifying entity may receive one of the following three forms of the certificate chains: (1.) all non-hybrid certificates with old cryptosystem elements; (2.) all hybrid certificates with old and new cryptosystem elements; and (3.) a mixture of hybrid and non-hybrid certificates with hybrids at the top of the chain.

Since hybrid certificates provide backwards compatibility, a mixed chain (Form 3 noted above) will not cause any issues as long as the same public keys of old cryptosystem is placed in the hybrid certificates as the original non-hybrid certificates with the old cryptosystem. However, if it is desired to avoid mixture (Form 3) the intermediate CAs may hold on to the old cryptosystem-only certificate chain (Form 1), where it provided this chain when issuance of a non-hybrid old cryptosystem is requested and provide a hybrid certificate chain only when a hybrid certificate is requested.

In the hybrid crypto-agile certificates, the same public keys are used for the old cryptosystem, except the identifying end entities. The merit for using the same public key for the identifying end entities is very small; the decision may be left to the implementor/operator.

When migrating hybrid certificates chain to non-hybrid certificate chains, the situation is different. Since all the CAs on the path of the certificate chain are capable of handling hybrid certificates, these CAs are capable of handling the new cryptosystem. Therefore, at any point, any intermediate CA or the identifying end entity can obtain a non-hybrid certificate with new cryptosystem elements. The identifying end entity may receive one of the following three forms of certificate chain: (1.) all hybrid certificates with old and new cryptosystem elements; (2.) all non-hybrid certificates with new cryptosystem elements; and (3.) a mixture of hybrid and non-hybrid certificates in any order. In this context, non-hybrid certificates do not provide backwards compatibility. Therefore, Forms 2 or 3 can be used when it is certain that the verifying end entity is capable of handling the new cryptosystem. An identifying end entity may maintain the hybrid certificate chain, Form 1, until such a time that it knows that all the verifying end entities that it communicates with are capable of handling the new cryptosystem. Here, a mixed chain (Form 3) does not seem to have any significant advantage since the verifying end entity must use the new cryptosystem. Then, Form 3 can make the chain validation process unnecessarily complex and may be disregarded in some environments. This means that an identifying end entity may own a certificate chain of Form 1 or 2, or both. One strategy is for each CA to issue a non-hybrid certificate with a non-hybrid certificate chain (with new crypto only) when the lower CA or an identifying end entity requests a non-hybrid certificate. If a hybrid certificate is requested, a CA can issue a hybrid certificate with a hybrid certificates chain.

The new non-hybrid root certificate should use the same public key as that in the alternative crypto extension of the secondary crypto-agile hybrid certificate of the Root CA. However, all the other non-hybrid certificates can use a new key pair; the decision can be left to the implementor/operator.

Figure 3:
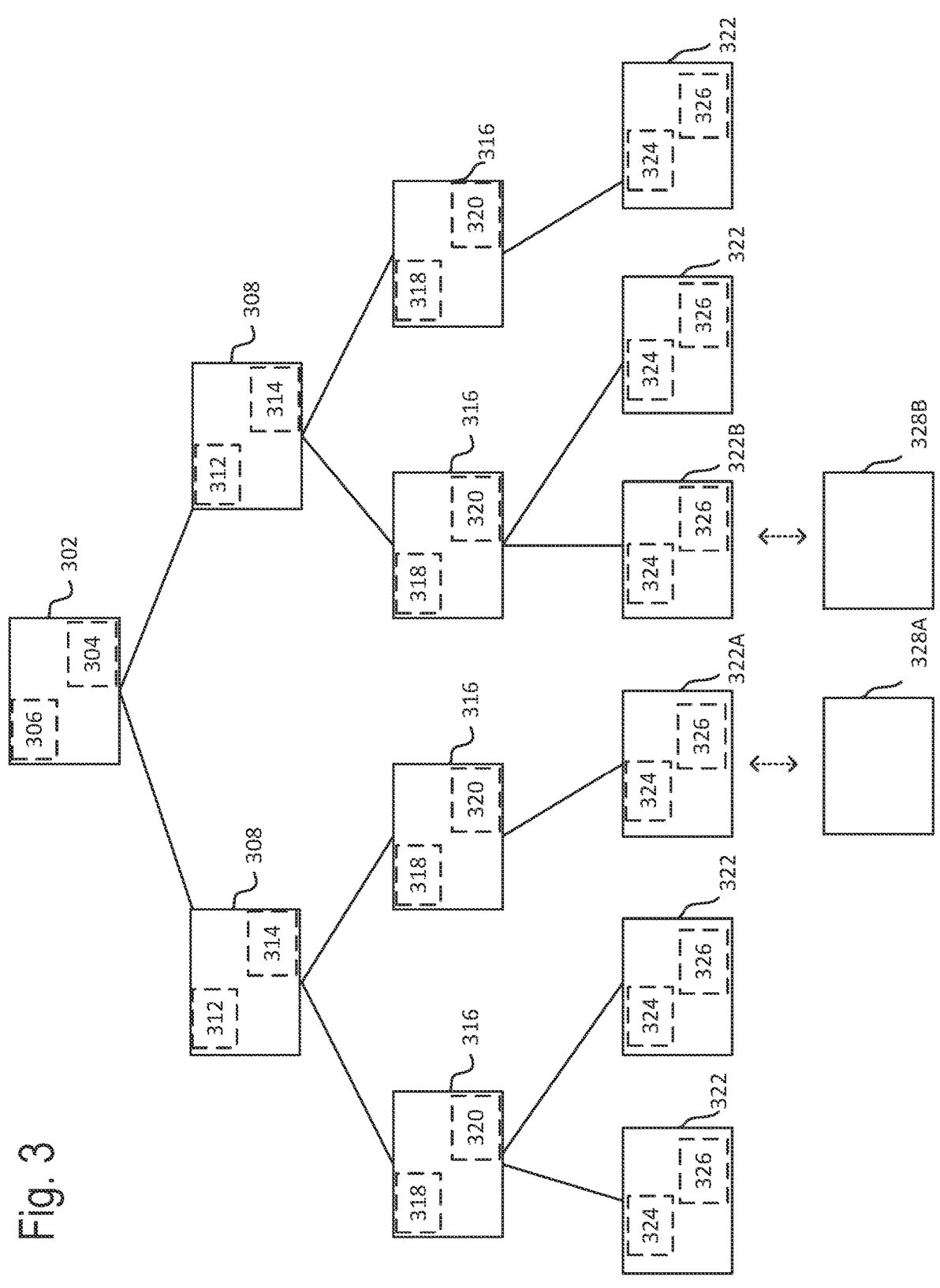
FIG. 3 is a block diagram of an example PKI tree.

FIG. 3 is a block diagram of an example PKI tree 300 for a PKI system that has at least partially transitioned from crypto-agile hybrid certificates to standard non-hybrid certificates for the new cryptosystem. The PKI tree 300 includes a root CA 302. The root CA 302 has a non-hybrid root certificate 304 for the new cryptosystem and a crypto-agile hybrid certificate 306 for the new cryptosystem and an old cryptosystem. In various embodiments, the root CA 302 may correspond to the root CA 102 illustrated in FIGS. 1A and 1B.

In the example shown in FIG. 3, the root certificate 304 is a non-hybrid, self-signed root certificate that contains the root CA's public key for the new cryptosystem and a signature generated using the CA's corresponding private key for the new cryptosystem. For instance, the root certificate 304 can be a standard, self-signed root certificate for the new cryptosystem. The crypto-agile hybrid certificate 306 of the root CA 302 may correspond to the secondary crypto-agile hybrid certificate 162B of the root CA 102 shown in FIGS. 1A and 1B. In some instances, a non-hybrid, self-signed root certificate that contains the root CA's public key for the old cryptosystem may be retained. Once the crypto-agile hybrid certificate 306 of the root CA becomes a trusted anchor, the self-signed root certificate for the old cryptosystem may not be used; however, the self-signed root certificate for the old cryptosystem remains as a root certificate of the hybrid certificate chain.

The PKI tree 300 also includes $1^{st}$ level intermediate CAs 308. In various embodiments, the $1^{st}$ level intermediate CAs 308 may correspond to distinct instances of the $1^{st}$ level intermediate CA 104 illustrated in FIGS. 1A and 1B. Each $1^{st}$ level intermediate certificate authority 308 has a non-hybrid certificate 312 for the new cryptosystem and also has a crypto-agile hybrid certificate 314 for the new cryptosystem and the old cryptosystem. Each non-hybrid certificate 312 can be a standard certificate for the new cryptosystem; each non-hybrid certificate 312 is issued by the root certificate authority 302. Each crypto-agile hybrid certificate 314 may correspond to an instance of the crypto-agile hybrid certificate 164B shown in FIGS. 1A and 1B; each crypto-agile hybrid certificate 314 is issued by the root certificate authority 302.

The PKI tree 300 also includes 2nd level intermediate CAs 316. In various embodiments, each of the 2nd level intermediate CAs 316 may correspond to an instance of the 2nd level intermediate CA 106 illustrated in FIGS. 1A and 1B. Each 2nd level intermediate CA 316 has a non-hybrid certificate 318 for the new cryptosystem and also has a crypto-agile hybrid certificate 320 for the new cryptosystem and the old cryptosystem. Each non-hybrid certificate 318 can be a standard certificate for the new cryptosystem; each non-hybrid certificate 318 is issued by one of the 1st level intermediate CAs 308. Each crypto-agile hybrid certificate 320 may correspond to an instance of the crypto-agile hybrid certificate 166B illustrated in FIGS. 1A and 1B; each crypto-agile hybrid certificate 320 is issued by one of the 1st level intermediate CAs 308. While FIG. 3 illustrates the PKI tree 300 including the 1st level intermediate CA 308 and the 2nd level intermediate CA 316, in various implementations, the PKI tree 300 could include any number of intermediate CAs and any number of levels. For example, in various implementations, the PKI tree 300 may include three or more intermediate CA levels, while in other implementations, the PKI tree 300 may include a single intermediate CA level.

The PKI tree 300 also includes identifying end entities 322 that obtain certificates issued by one of the $2^{nd}$ level intermediate CA 316. One or more of the identifying end entities 322 may have a non-hybrid certificate 324 for the new cryptosystem and may also have a crypto-agile hybrid certificate 326 for the new cryptosystem and the old cryptosystem. In some instances, one or more of the end entities 322 has a crypto-agile hybrid certificate 326 for the new cryptosystem and the old cryptosystem, but does not yet have a non-hybrid certificate 324 for the new cryptosystem. Each non-hybrid certificate 324 of an end entity 322 can be a standard certificate for the new cryptosystem. Each crypto-agile hybrid certificate 326 of an end entity 322 may correspond to an instance of the crypto-agile hybrid certificate 168B illustrated in FIGS. 1A and 1B.

In a typical use case, a certificate chain is provided by an identifying end entity, and a trusted root certificate is available to a verification end entity. When an identifying end entity presents its identity as a certificate and a certificate chain to the verifying end entity, the identifying end entity sends the chain of certificates only up to the $1^{st}$ level intermediate CA. The identifying end entity does not include a root certificate in the certificate chain it sends. It is the verifying end entity that possesses root certificates that the verifying end entity trusts. The verifying end entity verifies the signature on the certificate of the $1^{st}$ level intermediate CA using its trusted root certificate to complete the validation of the identifying end entity's certificate chain. Thus, mismatch of hybrid certificate chains and non-hybrid certificate chains can happen between the certificate chain of the identifying end entity and the root certificate owned by the verifying end entity, especially in the transition from a hybrid certificate chain to non-hybrid certificate chain with new cryptosystem elements.

In the non-hybrid certificate issuance, the Root CA issues a certificate to the $1^{st}$ level intermediate CAs. There is no certificate chain involved at this level. However, in the hybrid certificate issuance, the Root CA sends its secondary crypto-agile hybrid certificate as a chain from the root certificate to the certificate of the $1^{st}$ level intermediate CA. Thus, the lower level intermediate CAs and the identifying end entities will receive an additional certificate in the chain when hybrid certificates are used. The secondary crypto-agile hybrid certificate of the Root CA is included in the certificate chain that is sent to the verifying end entity.

As shown in FIG. 3, identifying end entities 322 can communicate with verifying end entities 328. For example, the identifying end entities 322 may represent web servers, and the verifying end entities 328 may represent web browsers that are obtaining content from the web servers. As part of this process the identifying end entity 322 identifies itself to the verifying end entity 328, and the verifying end entity 328 attempts to verify the identity of the identifying end entity 322. Generally, any number of verifying end entities 328 can communicate with identifying end entities 322. Two example verifying end entities 328A, 328B are shown in FIG. 3; a first verifying end entity 328A communicates with a first identifying end entity 322A, and a second verifying end entity 328B communicates with a second identifying end entity 322B.

To verify the identifying end entity 322, the verifying end entity 328 uses a certificate-based identity authentication process. Example certificate-based identity authentication processes are described below; these and other certificate-based identity authentication processes may be used. The certificate-based identity authentication process uses one of the certificates of the identifying end entity 322 and a corresponding certificate chain from the PKI tree 300. In the certificate-based identity authentication process, the identifying end entity 322 sends the verifying end entity 328 one of the certificates of the identifying end entity 322 and a corresponding certificate chain, and the verifying end entity 328 validates the certificate chain. The certificate chain is initially provided to the identifying end entity 322 by the CA that issued the certificate of the identifying end entity 322. Accordingly, when a CA issues a certificate, the CA builds a certificate chain that can be used with the certificate to verify the certificate.

When a verifying end entity receives a hybrid certificate chain, it verifies the signature on the hybrid certificate of the 1$^{st}$ level intermediate CA using the secondary crypto-agile hybrid certificate of the Root CA, which is in the received certificate chain. It may validate the chain using the old cryptosystem or the new cryptosystem or both. Then, the verifying end entity can verify the signature on the secondary crypto-agile hybrid certificate of the Root CA using the Root CA's root certificate, which is a non-hybrid certificate of the old cryptosystem. In instances where the old cryptosystem is valid, this provides trust on the secondary crypto-agile hybrid certificate of the Root CA. It can be said that the secondary crypto-agile hybrid certificate of the Root CA is chained to the root certificate. After this, the verifying end entity makes the secondary crypto-agile hybrid certificate of the Root CA as a trusted anchor certificate. Then, the certificate chain validation stops at this trusted anchor certificate, and the validation can use only the new cryptosystem. There is no need to keep the old root certificate of the old cryptosystem. Since the old root certificate and the new trusted anchor certificate contain the same public key, this is functional. In such an instance, there is a single trusted anchor certificate of the Root CA.

When the verifying end entity receives a new root certificate with new cryptosystem elements, if no identifying end entity is using only old crypto, then the verifying end entity no longer needs the secondary crypto-agile hybrid certificate of the Root CA that is marked and stored as the trusted anchor. However, if some identifying end entities are still using only old crypto, then the secondary crypto-agile certificate of the root CA is retained. Alternatively, if a verifying end entity deploys, for example, a security policy that rejects non-hybrid certificate chains based on old crypto and prefers new crypto over old crypto, then the secondary crypto-agile certificate of the root CA may be removed. In cases where the secondary crypto-agile certificate of the root CA is removed, there is only a single trusted anchor certificate of the Root CA. This is assuming that this verifying end entity is capable of handling the new cryptosystem; this assumption should typically be valid because the verifying end entity has received the new cryptosystem-only root certificate.

A hybrid certificates chain contains the secondary crypto-agile hybrid certificate of the Root CA even if the certificate is a trusted anchor at the verifying end entity. Let's consider the case where a verifying end entity has the secondary crypto-agile hybrid certificate of the Root CA as trusted anchor but does not have the new non-hybrid root certificate with new crypto. This verifying end entity may receive one of the following two certificate chains: (1.) all hybrid certificates; and (2.) all non-hybrid certificates with new cryptosystem elements. If the verifying end entity receives an all hybrid certificate chain, it validates the chain using the trusted anchor. If it receives an all non-hybrid certificate chain, the signature on the 1$^{st}$ level intermediate CA can be verified by using the public key in the alternative crypto extension of the trusted anchor certificate. This works because the Root CA's non-hybrid root certificate has the same public key as the public key in this trusted anchor certificate.

Now, consider the case where a verifying end entity has the new root certificate with new crypto. If no identifying end entity is using old non-hybrid certificate chains or if the identifying end entity rejects old non-hybrid certificate chains through policy settings, then this verifying end entity may receive one of the following two certificate chains: (1.) all hybrid certificates; and (2.) all non-hybrid certificates with new cryptosystem elements. If it receives an all hybrid certificates chain, it can use the new root certificate to verify the signature in the secondary crypto-agile hybrid certificate of the Root CA, which is the last certificate in the chain. Alternatively, it can use the new root certificate to verify the signature in the alternative crypto extension of the certificate of the 1$^{st}$ level intermediate CA, skipping the secondary crypto-agile hybrid certificate of the Root CA. This works because the public key in the alternative crypto extension of the secondary crypto-agile hybrid certificate of Root CA is the same as the public key in this new non-hybrid root certificate. If the verifying end entity receives an all non-hybrid certificate chain, this is a non-hybrid procedure of chain validation. Thus, the chain validation can be completed using the new root certificate.

Certificate Generation

In the example shown in FIG. 3, the root CA 302 generates the self-signed non-hybrid root certificate 304 using a key pair of the new cryptosystem. This key pair is the same key pair that was used to generate the public key and signature in the alternative cryptography extension of the secondary crypto-agile hybrid certificate 306 of the root CA 302. The new root certificate 304 is distributed at an appropriate time to the end entities 322, 328. In some instances, the root CA 302 may notify some or all subordinate entities of the availability of the new root certificate 304.

When a CA receives a certificate signing request ("CSR") from an entity, the CA may sign and issue a new certificate for the entity. To sign the new certificate, the CA generates a signature using one of its private keys. In various instances, the CA may sign a certificated issued by the CA using the new cryptosystem. In Method 1, the root CA 302 signs only with the new cryptosystem when receiving a CSR with only new cryptosystem elements. Thus, under Method 1, the root CA 302 maintains the secondary crypto-agile hybrid certificate 306 and new standard root certificates 304 until all the PKI system entities have migrated to the new cryptosystem. Under Method 2, the root CA 302 signs with the new cryptosystem even when signing of a crypto-agile hybrid certificate is requested.

Certificate Chain Construction

To obtain their non-hybrid certificates for the new cryptosystem, the 1$^{st}$ level intermediate CA 308 and the 2$^{nd}$ level intermediate CA 316 each request a non-hybrid certificate from a superior CA (e.g., the root CA 302 in the case of the 1$^{st}$ level intermediate CA 308, or the 1$^{st}$ level intermediate CA 308 in the case of the 2$^{nd}$ level intermediate CA 316) using only the new cryptosystem. To request the new non-hybrid certificate, the intermediate CA may use the same key pair (for the new cryptosystem) that was used to obtain the intermediate CA's existing crypto-agile hybrid certificate. This helps to simplify Certificate Revocation List ("CRL") or Online Certificate Status Protocol ("OCSP") signing. Alternatively, the 1$^{st}$ level intermediate CA 308 and the 2$^{nd}$ level intermediate CA 316 can generate a new key pair for the new cryptosystem to request a new non-hybrid certificate. However, in such a case, the $1^{st}$ level intermediate CA 308 and the $2^{nd}$ level intermediate CA 316 may keep their old key pair so that they can sign CRL or OCSP for those inquiring entities that receive the crypto-agile hybrid certificate chain instead of the new certificate chain.

In some implementations, an issuer CA may have to sign OCSP Response or CRL. During the transition from non-hybrid certificates with old crypto to crypto-agile hybrid certificates, the CAs still own the private keys of the old crypto because the hybrid certificates need them. In such an arrangement, the signature can be verified with the hybrid certificate or old non-hybrid certificate.

During the transition from hybrid certificates to non-hybrid certificates for the new cryptosystem, the CAs maintain hybrid certificates. Thus, the CAs keep the private key of the old cryptosystem because the hybrid chain is still in use, meaning there are still some legacy verifying end entities with only old cryptosystem capabilities. However, once the transition to the new cryptosystem completes for all end entities, the old private key can be discarded.

In the example shown in FIG. 3, after the intermediate CAs (308, 316) obtain non-hybrid certificates (312, 318) for the new cryptosystem, an identifying end entity 322 may requests a non-hybrid certificate for the new cryptosystem. In this case, the identifying end entity 322 may use the existing key pair for the new cryptosystem (which includes the new public key in the identifying end entity's existing crypto-agile hybrid certificate 326) or may produce another key pair for the new cryptosystem. In Method 1, an intermediate CA signs only with the new cryptosystem when receiving a Certificate Signing Request (CSR) with only new cryptosystem elements. Thus, the intermediate CA maintains the secondary crypto-agile hybrid certificate and the corresponding certificate chain. In Method 2, an intermediate CA signs only with the new cryptosystem even when a crypto-agile hybrid certificate is requested, and the intermediate CA (308, 316) provides a certificate chain that includes only non-hybrid certificates for the new cryptosystem.

Verifying End Entity without New Root Certificate

In a typical PKI system, distribution of a new root certificate may take time, and each of the verifying end entities may receive the new root certificate at different times. For example, there may be a period of time where the first verifying end entity 328A has received the non-hybrid root certificate 304 for the new cryptosystem but the second verifying end entity 328B has not yet received the non-hybrid root certificate 304 for the new cryptosystem. In such cases, if the identifying end entity 322B has retained its crypto-agile hybrid certificate 320, then the verifying end entity 328B receives the crypto-agile hybrid certificate chain. Then, the existing process to validate the crypto-agile hybrid certificate chain 320 remains effective. However, the identifying end entity 322B may instead use a certificate chain that does not include crypto-agile hybrid certificates (e.g., if the identifying end entity 322B has not retained its crypto-agile hybrid certificate 320), and in such cases, the verifying end entity 322B that does not have the new root certificate 304 may deploy a different method of certificate chain validation.

In the example shown in FIG. 3, the verifying end entity 328B has stored the secondary crypto-agile hybrid certificate 306 of the Root CA 302 as a trusted anchor. In some instances, the identifying end entity 322B may send the verifying end entity 328B a certificate chain that includes only non-hybrid certificates; for example, the certificate chain may include the non-hybrid certificate 324 of the identifying end entity 322B, the non-hybrid certificate 318 of a $2^{nd}$ level intermediate CA 316, and the non-hybrid certificate 312 of a $1^{st}$ level intermediate CA 308. In such instances, the verifying end entity 322B uses the public key (for the new cryptosystem) in the alternative cryptography extension of the crypto-agile hybrid certificate 306 of the root CA 302 to verify the signature on the non-hybrid certificate 312 of the $1^{st}$ level intermediate CA 308 (which is at the top of the certificate chain provided to the verifying end entity 328B).

If Method 2 is deployed, the verifying end entity 328B may receive a certificate chain of crypto-agile hybrid certificates and non-hybrid certificates. It must be able to trace the chain with new crypto. That is, if standard and hybrid certificates are mixed in the certificate chain, the verifying end entity 328B has to find the public keys and signatures in either standard locations or alternative crypto extensions, depending on the certificate type as the verifying end entity 328B traces up the certificate chain verifying the signatures.

Verifying End Entity with New Root Certificate

In the example shown in FIG. 3, the verifying end entity 328A has obtained the non-hybrid root certificate 304 of the certificate authority 302. If the identifying end entity 322A also has the non-hybrid certificate chain (including the non-hybrid certificate 324 of the identifying end entity 322A, the non-hybrid certificate 318 of a $2^{nd}$ level intermediate CA 316, and the non-hybrid certificate 312 of a $1^{st}$ level intermediate CA 308), standard certificate chain verification can be used. However, if the identifying end entity 322A does not have the new certificate chain yet, an alternative certificate chain verification process can be used. Accordingly, if the verifying end entity 328A receives a hybrid certificate chain (a certificate chain that includes one or more crypto-agile hybrid certificates) from the identifying end entity 322A, then the verifying end entity 328A may select an appropriate certificate chain verification process.

When verifying a hybrid certificate chain from the identifying end entity 322A, the verifying end entity 328A uses the non-hybrid root certificate 304 to verify the root CA's signature on the certificate of the $1^{st}$ level intermediate CA 308 (which is at the top of the certificate chain). The public key of the new root certificate 304 is the same as the public key in the alternative cryptography extension of the secondary crypto-agile hybrid certificate 306 of the Root CA 302. Thus, the verification can be appropriately performed. If Method 2 is deployed, the verifying end entity 322B may receive a certificate chain of crypto-agile hybrid certificates and non-hybrid certificates. The verifying end entity 322B will be able to trace the chain with new crypto. That is, if standard and hybrid certificates are mixed in the certificate chain, the verifying end entity 328B has to find the public keys and signatures in either standard locations or alternative crypto extensions, depending on the certificate type as the verifying end entity 328B traces up the certificate chain verifying the signatures.

In the example shown in FIG. 3, the intermediate CAs may request non-hybrid certificates in any order because all the CAs along the crypto-agile hybrid certificate chain are capable of handling the new cryptosystem. If the CA uses the same key pair (which includes the public key in the alternative cryptography extension of the CA's the crypto-agile hybrid certificate) to request a non-hybrid certificate, the hybrid certificate chain may remain valid when the new cryptosystem is used. If the certificate chain is mixture of hybrid certificates and non-hybrid certificates, a different chain validation process can be used. In some scenarios, it may be more practical to have the non-hybrid certificates obtained from the $1^{st}$ level intermediate CA down such that when the identifying end entity 328 requests a new certificate, the identifying end entity 328 receives a new certificate chain with only non-hybrid certificates (for a single cryptosystem). To ensure this result, each intermediate CA may delay issuing a non-hybrid certificate until the intermediate CA itself has a CA certificate chain of non-hybrid certificates stemming from the root CA 302.

In some cases, a transition to the non-hybrid (single-cryptography) certificate chain may occur on a certain part of the PKI system (e.g., a designated subset of intermediate CAs, a designated subset of end entities, etc.) stemming from the root CA 302 instead of the entire PKI system. In some cases, the transition process may take place on a part of the PKI system stemming from a certain intermediate CA or a certain identifying end entity, for example, when all the verifying end entities of the PKI subsystem are handling crypto-agile hybrid certificate chains that include the new cryptosystem, and are therefore capable of handling the new cryptosystem. In such cases, two root certificates (one with the old cryptosystem and the other with new cryptosystem) coexist because there are some identifying end entities that are still using non-hybrid certificate chains with old cryptosystem elements.

In some implementations, an alternative solution for PKI migration may be utilized. In some implementations, illustrated, for example, in FIG. 2B, the secondary crypto-agile hybrid certificate of the root CA is used, but other certificates in the certificate chain remain non-hybrid.

In some implementations, the first root certificate of the root CA (e.g., the original root certificate 162A in FIG. 1A) has been widely deployed and therefore already exists in the trust stores of other entities (e.g., verifying end entities, authenticating end entities), and the secondary crypto-agile certificate of the root CA (e.g., the secondary crypto-agile hybrid certificate 162B in FIG. 1A) will be deployed into the trust store on the other entities so that the secondary crypto-agile certificate of the root CA can act as a trust anchor, thereby enabling new crypto to be used for entity authentication.

Once a verifying end entity receives the secondary crypto-agile certificate of the root CA, the verifying end entity can use the first root certificate of the root CA to verify the validity of the secondary crypto-agile certificate of the root CA, and then add the secondary crypto-agile certificate of the root CA to the trust store upon successful verification. Once in the trust store, the secondary crypto-agile certificate of the root CA becomes a trust anchor that enables entity authentication using the new cryptography system.

In various implementations, should the CA's private key corresponding to the public key contained in the first root certificate of the root CA (e.g., 102 in FIG. 1A) for the old cryptosystem become vulnerable (such that it can no longer be used securely), verifying end entities may use the new cryptosystem by chaining up to the secondary crypto-agile certificate of the root CA for entity verification, for example, using the CA's public key (e.g., 114 in FIG. 1A) for the new cryptosystem in the secondary crypto-agile certificate of the root CA.

Entity authentication using the CA's public key (e.g., 110 in FIG. 1A) for the old cryptosystem can still chain up to either the first root certificate of the root CA or the secondary crypto-agile certificate of the root CA, while entity authentication using the CA's public key for the new cryptosystem can chain up to the secondary crypto-agile certificate of the root CA. Therefore, the certificate verification platform remains backward compatible with the CA's public key for the old cryptosystem.

In some implementations, only the secondary crypto-agile certificate of the root CA is a hybrid certificate. All other certificates (such as, for example, the original non-hybrid certificate 164A of the $1^{st}$ level intermediate CA 104, the original non-hybrid certificate 166A of the $2^{nd}$ level intermediate CA 106, and the original non-hybrid certificate 168A of the end entity 108 in FIG. 1A) may be conventional non-hybrid certificates. Nevertheless, the present scheme achieves transitioning to new crypto while remain backward compatible with the old crypto key.

In this scenario, if a certificate utilizing a public key for the old cryptosystem is requested by the $1^{st}$ level intermediate CA 104, the root CA 102 issues a non-hybrid certificate for the old cryptosystem, and the secondary crypto-agile hybrid certificate of the root CA is a part of the certificate chain. The CA's private key for the old cryptosystem may then be used to sign the non-hybrid certificate of the $1^{st}$ level intermediate CA 104. If a certificate utilizing a public key for the new cryptosystem is requested by the $1^{st}$ level intermediate CA 104, the Root CA 102 may issue a non-hybrid certificate for the new cryptosystem; in this case, the non-hybrid certificate is signed with the CA's private key that corresponds to the CA's public key for the new cryptosystem in the extension of the secondary crypto-agile hybrid certificate of the root CA.

Similar to the Root CA 102, an intermediate CA (104, 106) issues a certificate for the old cryptosystem using its private key for the old cryptosystem that corresponds to the public key in the intermediate CA's (104, 106) first certificate for the old cryptosystem. In various implementations, the intermediate CA's (104, 106) first certificate for the old cryptosystem may be for example, the original non-hybrid certificate 164A of the 1st level intermediate CA 104 or the original non-hybrid certificate 166A of the $2^{nd}$ level intermediate CA 106. If a certificate for the new cryptosystem is requested, the intermediate CA (104, 106) uses the private key for the new cryptosystem that corresponds to the public key in the non-hybrid certificate for the new cryptosystem. In various implementations, an intermediate CA (104, 106) may have to maintain both old and new certificates. In certain scenarios, the secondary crypto-agile certificate of the root CA is always included in the certificate chain.

In various implementations, an identifying end entity has a certificate chain of either old or new crypto. In either case, the secondary crypto-agile hybrid certificate of the root CA is a part of the certificate chain as the only hybrid certificate. All the other certificates, such as certificates of the intermediate CAs (104, 106) are non-hybrid. In various implementations, the non-hybrid certificates of the intermediate CAs (104, 106) may include either old crypto or new crypto.

For the old crypto certificate chain, standard chain validation is applied. For the new crypto certificate chain, the chain validation can go up to the secondary crypto-agile hybrid certificate of the Root CA and use the alternative public key in the secondary crypto-agile hybrid certificate of the Root CA for verification.

In various implementations, the root CA 102 may generate a new root certificate with the same public key for the new cryptosystem as that in the extension of the secondary crypto-agile hybrid certificate of the root CA. A verifying end entity with a new root certificate for the new cryptosystem may stop using the secondary crypto-agile hybrid certificate of the root CA and directly verify the signature on the certificate of the 1ˢᵗ level intermediate CA 104 using the new root certificate of the root CA 102.

Figure 4:
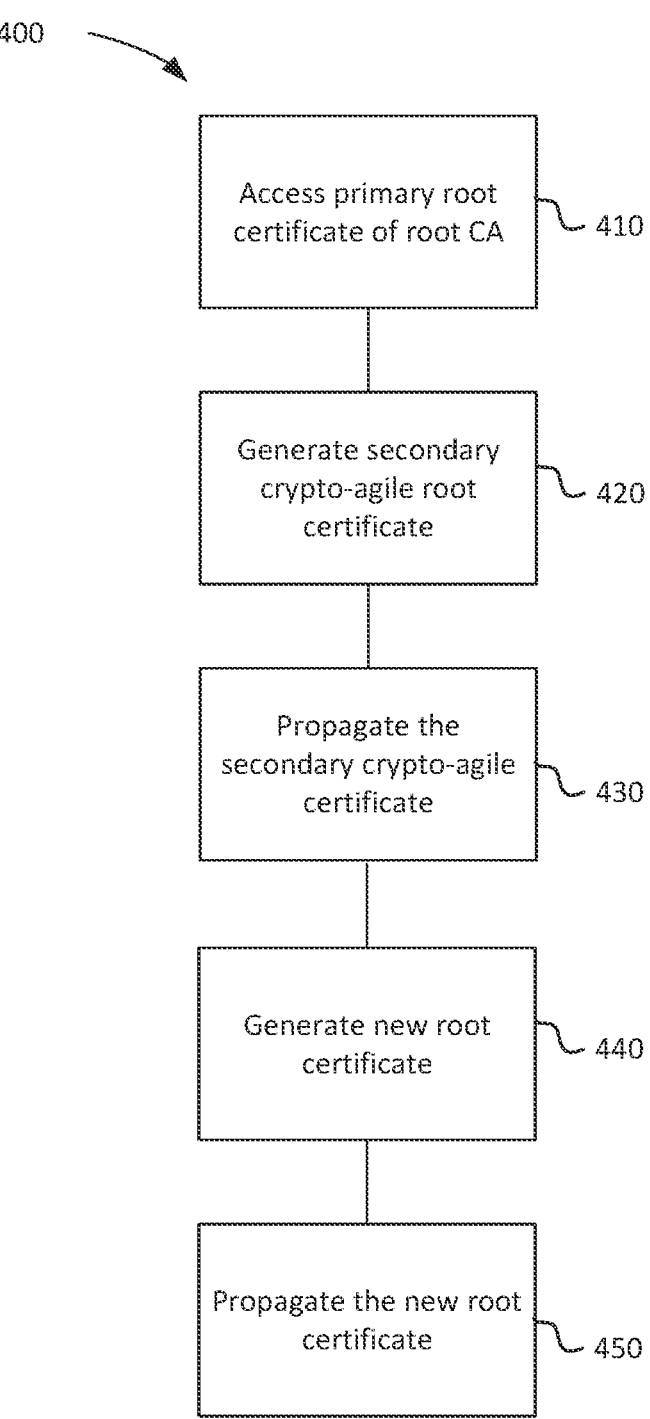
FIG. 4 is a flow diagram illustrating an example process for updating a cryptosystem.

FIG. 4 is a flow diagram illustrating an example process 400 for updating a PKI system, such as, for example, the public key infrastructure system 100 discussed above with respect to FIGS. 1A and 1B or another type of PKI system. The example process 400 may include additional or different operations, and the operations may be performed in the order shown or in another order. In some cases, one or more operations may be repeated, omitted, or performed in another manner. The process 400 may be performed by one or more computer nodes or devices, for example, by one or more of the certificate authority nodes 514, 516 shown in FIG. 5, or by another type of computer system.

At 410, a primary root certificate of a root certificate authority is accessed. As an example, the root certificate authority can be the root CA 102 shown in FIG. 1A, and the primary root certificate can be the original non-hybrid root certificate 162A shown in FIG. 1A. In the example process 400, the primary root certificate includes a first public key that is based on a first cryptosystem and a first signature that is generated with a private key that corresponds to the first public key. As an example, the first public key can be the public key 110 in FIG. 1A and the first signature can be the signature 112 illustrated in FIG. 1A.

At 420, a secondary crypto-agile root certificate of the root certificate authority is generated. As an example, the secondary crypto-agile root certificate can be the secondary crypto-agile root certificate 162B illustrated in FIGS. 1A and 1B. In the example process 400, the secondary crypto-agile root certificate includes the first public key of the root certificate authority and a second public key of the root certificate authority that is based on a second cryptosystem. As an example, the second public key can be the public key 114 illustrated in FIGS. 1A and 1B.

In the example process 400, the secondary crypto-agile root certificate of the root certificate authority also includes a second signature of the root certificate authority that is generated with a second private key that corresponds to the second public key. As an example, the second signature can be the signature 116 shown in FIGS. 1A and 1B. In the example process 400, the secondary crypto-agile certificate includes a third signature of the root certificate authority that is generated with the first private key. For instance, the third signature can be the signature 118 illustrated in FIGS. 1A and 1B. Accordingly, the secondary crypto-agile root certificate of the root certificate authority can be a self-signed certificate, which contains two signatures of the root certificate authority.

At 430, the secondary crypto-agile root certificate is propagated to at least one subordinate entity in the PKI system. The subordinate entities may include intermediate certificate authorities, end entities or both. In some cases, the subordinate entities include multiple levels of certificate authorities, such as, for example, first-level intermediate certificate authorities (e.g., the first-level intermediate certificate authority 104 shown in FIGS. 1A and 1B) and second-level intermediate certificate authorities (e.g., the second-level intermediate certificate authority 106 shown in FIGS. 1A and 1B). In some cases, the subordinate entities include several end entities, such as, for example, the end entity 108 shown in FIGS. 1A and 1B and additional end entities. In some implementations, the secondary crypto-agile root certificate is propagated throughout an enterprise or organization, for example, to hundreds or thousands of entities in the PKI system. In such cases, each first-level intermediate certificate authority propagates the secondary crypto-agile root certificate to one or more second-level intermediate certificate authorities, and so forth until all entities in the enterprise or organization have been updated.

In the example process 400, propagating the secondary crypto-agile root certificate causes the secondary crypto-agile root certificate to be inserted in a certificate chain between the primary root certificate and a certificate of an intermediate certificate authority; the updated certificate chain (containing the inserted certificate) may then be distributed to one or more subordinate entities in the PKI system. For instance, the secondary crypto-agile root certificate may be inserted in the certificate chain as illustrated in the example certificate chains 200A and 200B shown in FIGS. 2A and 2B. In some cases, the secondary crypto-agile root certificate may be inserted in another manner. In some implementations, the secondary crypto-agile root certificate is propagated further in the PKI system, for instance, by initiating further updates in the certificate chain. For example, propagating the secondary crypto-agile root certificate may include further operations such as those shown in FIGS. 1A, 2C, 2D, and 2E. In various implementations, distribution of a certificate chain includes propagating certificates of the certificate chain to lower entities beginning with a certificate below the original root certificate 162A of the root certificate authority 102. For instance, in some implementations, distribution of a certificate chain would include propagating certificates starting with a secondary crypto-agile root certificate 162B of the certificate authority 104. The original root certificate 162A of the root certificate authority 102 is not distributed as part of the certificate chain.

In an example implementation of the process 400, propagating the secondary crypto-agile root certificate includes the root CA notifying the intermediate CA that the secondary crypto-agile root certificate is available; the intermediate CA then requests an updated certificate from the root CA; the root CA then generates a secondary crypto-agile certificate for the intermediate CA responsive to the request; and the root CA sends the secondary crypto-agile certificate of the intermediate CA to the intermediate CA for use in the PKI system.

At 440, a new root certificate of the certificate authority is generated. The new root certificate can be, for example, the certificate 162C shown in FIG. 1B or the certificate 304 shown in FIG. 3. In the example process 400, the new root certificate includes the second public key of the root certificate authority and a fourth signature of the root certificate authority that is generated with the second private key. For instance, the fourth signature can be the signature 152 shown in FIG. 1B. In some cases, the new root certificate is formatted according to a digital certificate standard such as, for example, the X.509 digital certificate standard from the ITU.

At 450, the new root certificate is propagated to at least one subordinate entity in the PKI system. In some cases, propagating the new root certificate causes the primary root certificate and the secondary crypto-agile certificate to be replaced by the new root certificate in the certificate chain; the updated certificate chain (containing the new root certificate) may then be distributed to one or more subordinate entities in the PKI system. In various implementations, distribution of a certificate chain includes propagating certificates of the certificate chain to lower entities beginning with a certificate below the root certificate of the root certificate authority. For instance, in some implementations, distribution of a certificate chain would include propagating certificates starting with a first-level intermediate certificate authority. The root certificate of the root certificate authority is not distributed as part of the certificate chain. In some implementations, the new root certificate is propagated further in the PKI system, for instance, by initiating further updates in the certificate chain. For example, propagating the new root certificate may include further operations such as those described with respect to FIG. 1B. In some cases, the new root certificate is propagated through the PKI system to upgrade the PKI system from the first cryptosystem to the second cryptosystem (e.g., for a higher level of security, etc.). In some cases, when the propagation and upgrade are complete, the PKI system no longer uses the first cryptosystem.

Figure 5:
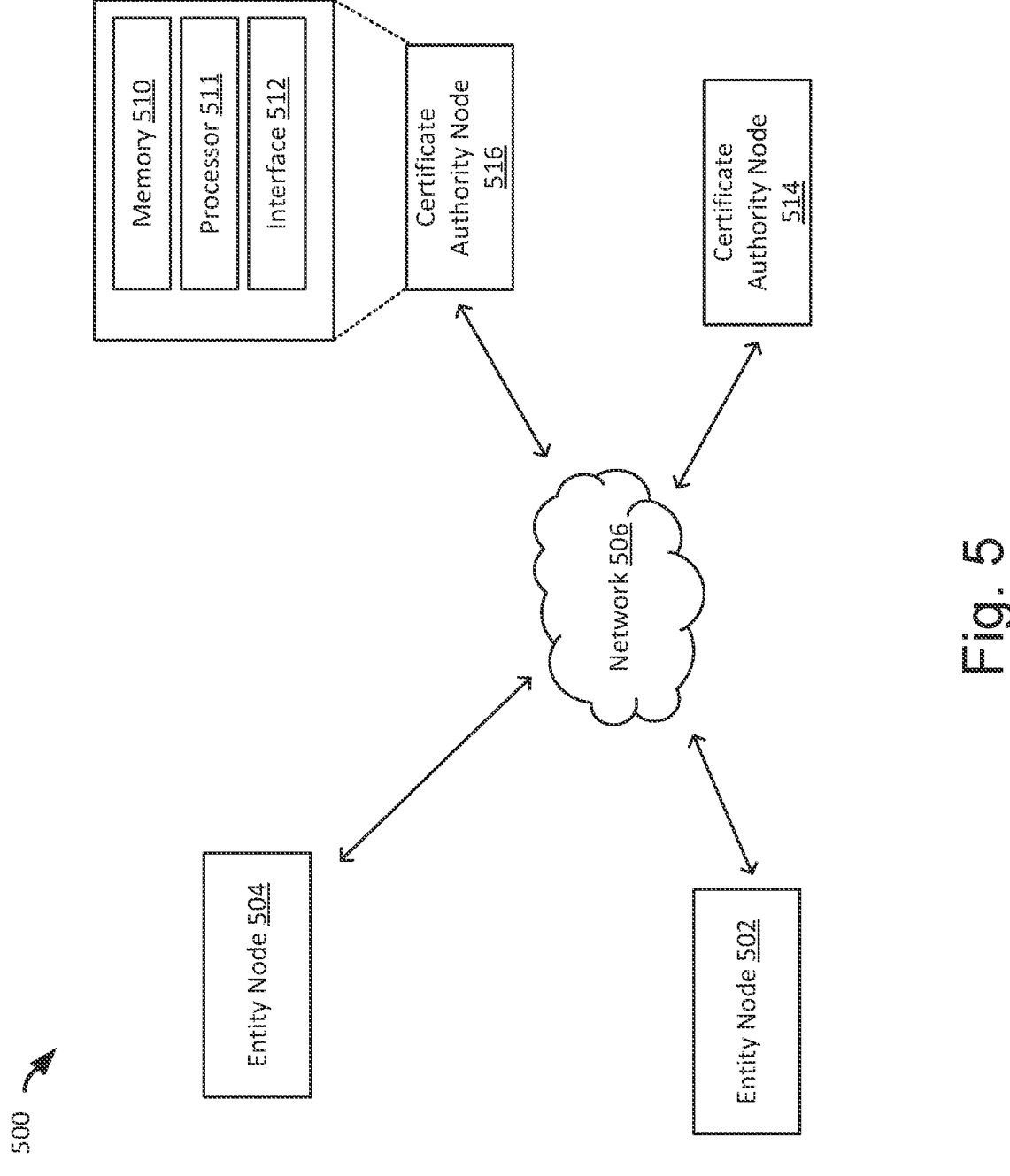
FIG. 5 is a schematic diagram of an example computing environment.

FIG. 5 is a block diagram showing aspects of an example computing environment 500. The example computing environment 500 shown in FIG. 5 includes four nodes—two entity nodes 502, 504, and two certificate authority nodes 514, 516. The nodes use a cryptographic scheme to communicate with each other over a network 506. The computing environment 500 may include additional or different features, and the components in a computing environment may be configured to operate as shown in FIG. 5 or in another manner.

Nodes in the computing environment 500 may have a client-server relationship. For example, the node 502 can be a server and the node 504 can be its client in a client-server network, or vice-versa. In some implementations, nodes in the computing environment 500 may have a peer-to-peer relationship. For example, the nodes 502, 504 can be peers in a client-server network, in a peer-to-peer network, or another type of network. Nodes may have another type of relationship in the computing environment 500.

In some instances, the computing environment 500 uses a public key infrastructure (PKI) for cryptographic correspondence. In a typical public key infrastructure (PKI), entities can authenticate each other based on certificates issued by trusted certificate authorities. The entities in the PKI (e.g., users, user accounts, devices or machines, software modules, or other types of entities) each have a user identity and a key pair that includes a public key and a private key, and a certificate authority can issue a digital certificate to bind the public key to the entity's user identity.

In some example PKIs, there are two types of digital certificates—certificate authority (CA) certificates and end-entity certificates. A CA certificate can be used to authenticate other certificates. An end-entity certificate can be used to identify an entity (the certificate owner). In the example shown in FIG. 5, each of the entity nodes 502, 504 can be associated with an entity that has an end-entity certificate, and each of the certificate authority nodes 514, 516 can be associated with a certificate authority that has a CA certificate.

In the example shown in FIG. 5, the example entity nodes 502, 504 and the certificate authority nodes 514, 516 each have computational resources (e.g., hardware, software, firmware) that are used to communicate with other nodes. In some implementations, nodes in the computing environment 500 can be implemented in various systems, such as, for example, laptops, desktops, workstations, smartphones, tablets, personal digital assistants, servers, server clusters, mainframes, and other types of computer systems. As shown in FIG. 5, the example node 516 includes a memory 510, a processor 511 and an interface 512. Each of the entity nodes 502, 504 and the certificate authority nodes 514, 516 may include the same, additional, or different components. In some cases, a single device may operate both as an entity node and as a certificate authority node.

In the example node 516 shown in FIG. 5, the memory 510 can include, for example, random access memory (RAM), a storage device (e.g., a writable read-only memory (ROM) or others), a hard disk, or another type of storage medium. The example memory 510 can store instructions (e.g., computer code, a computer program, etc.) associated with an operating system, computer applications, and other resources. The memory 510 can also store application data and data objects that can be interpreted by one or more applications or virtual machines running on the node 516. The node 516 can be preprogrammed, or it can be programmed (and reprogrammed), by loading a program from another source (e.g., from a DVD-ROM, from a removable memory device, from a remote server, from a data network or in another manner). In some cases, the memory 510 stores computer-readable instructions for software applications, scripts, programs, functions, executables, or other modules that are interpreted or executed by the processor 511.

In the example node 502 shown in FIG. 5, the processor 511 can execute instructions, for example, to generate output data based on data inputs. For example, the processor 511 can run computer programs by executing or interpreting the software, scripts, programs, functions, executables, or other modules stored in the memory 510. The example processor 511 shown in FIG. 5 can include one or more chips or chipsets that include analog circuitry, digital circuitry, or a combination thereof. In some cases, the processor 511 includes multiple processor devices such as, for example, one or more main processors and one or more co-processors. For instance, the processor 511 may include a main processor that can delegate certain computational tasks to a cryptographic co-processor, which may be configured to perform the computational tasks more efficiently than the main processor or in parallel with other computational tasks performed by other processor devices. In some instances, the processor 511 coordinates or controls operation of other components of the node 516, such as, for example, user interfaces, communication interfaces, peripheral devices, and possibly other components.

In the example node 516 shown in FIG. 5, the interface 512 provides communication with other nodes or devices. In some cases, the interface 512 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 512 includes a wired communication interface (e.g., USB, Ethernet) that can be connected to one or more input/output devices, such as, for example, a keyboard, a pointing device, a scanner, or a networking device such as a switch or router, for example, through a network adapter.

The example network 506 can include all or part of a connector, a data communication network, or another type of communication link. For example, the network 506 can include one or more wired or wireless connections, one or more wired or wireless networks or other communication channels. In some examples, the network 506 includes a Local Area Network (LAN), a Wide Area Network (WAN), a private network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

The nodes in the example computing environment 500 include secure communication modules (e.g., a Virtual Private Network (VPN), secure web browsing, secure mail, etc.) or other types of system components that use the PKI for authentication and use the related cryptographic keys for identification (e.g., in a digital signature-based zero-knowledge proof or another type of identification mechanism) to establish the trusted identity of participating entities. The security of such authentication and identification mechanisms may rely on one or more cryptography systems ("cryptosystems"). Examples of crypto-systems include a variety of RSA-based cryptosystems, ECC-based cryptosystems, lattice-based cryptosystems, code-based cryptosystems, isogeny-based cryptosystems, and others. A cryptosystem typically defines a set of cryptographic protocols and parameters to be used in the cryptographic protocols.

In the example shown in FIG. 5, the computing environment 500 can utilize a digital signature scheme, in which public keys are certified by digital certificates issued by the certificate authority nodes 514, 516. The digital certificates can include the example digital certificates described above with respect to FIGS. 1A and 1B. The digital certificates can form a certificate chain that includes a primary root certificate, and a secondary crypto-agile root certificate can be generated by one of the certificate authority nodes 514, 516. The secondary crypto-agile root certificate may then be propagated to, and used by, other entities in the computing environment 500. In some cases, a new root certificate is generated by one of the certificate authority nodes 514, 516, and the new root certificate may then be propagated to, and used by, other entities in the computing environment 500. Example processes for generating and propagating digital certificates are described above. The digital certificates that are generated and propagated in the example computing environment can be used (e.g., by the entity nodes 502, 504) for certificate-based identity authentication.

Certificate-Based Identity Authentication Processes

Certificate-based identity authentication process uses a PKI system, digital signatures and digital certificates to establish functioning identity authentication. A digital signature algorithm is used to generate and verify digital signatures. In some cases, certificate-based identity authentication can be performed between two entities (in which a "verifier" entity authenticates the identity of an "identifier" entity) based on the following process:

1. The verifier sends a random challenge to the identifier.
2. The identifier appends its digital certificate in the form of a certificate chain to the random challenge.
3. The identifier signs above concatenated data.
4. The identifier sends this concatenated data along with the signature.
5. The verifier verifies the received signature using the public key in the identifier's certificate.
6. The verifier then validates/verifies the certificate chain, verifying the signatures on the certificates in the chain.
7. For the last certificate in the chain, verifier uses the trusted root certificate it has to verify the signature on it.

In the example process outlined above, the identifier presents the digital certificate to the verifier. The identifier signs the concatenation of the random challenge and the digital certificate, and sends the concatenated data and the digital signature to the verifier. The reason for the random challenge is to prevent replay attacks. The verifier verifies the identifier's signature on the concatenated data to confirm the integrity of the data and the possession of the private key. The verifier then checks the CA's signature on the certificate to get assurance that this identifier is legitimate. To obtain the public key of the CA to verify the signature, a digital certificate of this CA is used. A higher CA that assures an intermediate CA may also be used. In this case, the identifier presents not only its own digital certificate but also the intermediate CA's digital certificate. The verifier verifies the digital signature on the identifier's digital certificate using this intermediate CA's digital certificate. The public key of the higher CA is used to verify the digital signature on the intermediate CA's digital certificate. Thus, the higher CA's digital certificate is needed. There are multiple hierarchical certificates that are connected by signatures, from the higher CA to the intermediate CA to the identifier. Based on this certificate chain, the verifier verifies the signatures on these digital certificates using a certificate chain validation process or a certificate chain verification process.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media, and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to, and receiving documents from, a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect, the systems and techniques described here allow for transitioning to and from hybrid crypto-agile public key infrastructure systems.

In a first example, a method includes accessing a primary root certificate of a root certificate authority of a PKI system. The primary root certificate includes a first public key based on a first cryptosystem and a first signature generated with a private key that corresponds to the first public key. A secondary crypto-agile root certificate of the root certificate authority is generated. The secondary crypto-agile root certificate includes the first public key of the root certificate authority, a second public key of the root certificate authority that is based on a second cryptosystem, a second signature of the root certificate authority that is created with a second private key that corresponds to the second public key, and a third signature of the root certificate authority that is generated with the first private key. The secondary crypto-agile root certificate is propagated to at least one subordinate entity in the PKI system. Propagating the secondary crypto-agile root certificate causes the secondary crypto-agile root certificate to be inserted into a certificate chain between the primary root certificate and a certificate of an intermediate certificate authority.

Implementations of the first example may include notifying the intermediate certificate authority that the secondary crypto-agile root certificate is available. Propagating the secondary crypto-agile certificate to subordinate entities may include generating a secondary crypto-agile certificate of the intermediate certificate authority responsive to a request from the intermediate certificate authority. The secondary crypto-agile certificate of the intermediate certificate authority may include a first public key of the intermediate certificate authority that is based on the first cryptosystem, a second public key of the intermediate certificate authority that is based on the second cryptosystem, a first signature that is generated with the first private key of the root certificate authority, and a second signature that is generated with the second private key of the root certificate authority. The secondary crypto-agile certificate of the intermediate certificate authority is sent to the intermediate certificate authority. In some cases, the intermediate certificate authority may be a first-level intermediate certificate authority and propagating the secondary crypto-agile root certificate to subordinate entities includes propagating the secondary crypto-agile root certificate to a plurality of intermediate certificate authorities and a plurality of end entities. The plurality of certificate authorities may include a first-level intermediate certificate authority and a second-level intermediate certificate authority.

In some implementations of the first example, propagating the secondary crypto-agile root certificate to subordinate entities includes propagating the secondary crypto-agile root certificate to a plurality of first-level intermediate certificate authorities. Each of the plurality of first-level intermediate certificate authorities may further propagate the secondary crypto-agile root certificate to one or more second-level intermediate certificate authorities.

In some implementations of the first example, after propagating the secondary crypto-agile root certificate, a new root certificate of the certificate authority is generated. The new root certificate includes the second public key of the root certificate authority and a fourth signature of the root certificate authority that is generated with the second private key. The new root certificate is propagated to the at least one subordinate entity. Propagating the new root certificate causes the primary root certificate and the secondary crypto-agile certificate to be replaced by the new root certificate in the certificate chain. The new root certificate is propagated to upgrade the PKI system from the first cryptosystem to the second cryptosystem, and the new root certificate is formatted according to a digital certificate standard.

In a second example, a system includes one or more processors and memory storing instructions that are operable when executed by the one or more processors to perform on or more operations of the first example. In a third example, a non-transitory computer-readable medium includes instructions that, when executed by a data processing apparatus of a computer system, perform one or more operations of the first example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be used. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:

accessing a primary root certificate of a root certificate authority of a PKI system, the primary root certificate comprising a first public key based on a first cryptosystem and a first signature generated with a private key that corresponds to the first public key;

generating a secondary crypto-agile root certificate of the root certificate authority, the secondary crypto-agile root certificate comprising:

the first public key of the root certificate authority;

a second public key of the root certificate authority based on a second cryptosystem;

a second signature of the root certificate authority generated with a second private key that corresponds to the second public key; and a third signature of the root certificate authority generated with the first private key; and propagating the secondary crypto-agile root certificate to at least one subordinate entity in the PKI system, wherein propagating the secondary crypto-agile root certificate causes the secondary crypto-agile root certificate to be inserted in a certificate chain between the primary root certificate and a certificate of an intermediate certificate authority.

2. The method of claim 1, wherein propagating the secondary crypto-agile root certificate comprises notifying the intermediate certificate authority that the secondary crypto-agile root certificate is available.

3. The method of claim 2, wherein the propagating further comprises:

responsive to a request from the intermediate certificate authority, generating a secondary crypto-agile certificate of the intermediate certificate authority, the secondary crypto-agile certificate of the intermediate certificate authority comprising:

a first public key of the intermediate certificate authority based on the first cryptosystem;

a second public key of the intermediate certificate authority based on the second cryptosystem;

a first signature generated with the first private key of the root certificate authority; and a second signature generated with the second private key of the root certificate authority; and sending the secondary crypto-agile certificate of the intermediate certificate authority to the intermediate certificate authority.

4. The method of claim 2, wherein the intermediate certificate authority is a first-level intermediate certificate authority, and propagating the secondary crypto-agile root certificate comprises propagating the secondary crypto-agile root certificate to a plurality of intermediate certificate authorities and a plurality of end entities.

5. The method of claim 4, wherein the plurality of certificate authorities comprises the first-level intermediate certificate authority and a second-level intermediate certificate authority.

6. The method of claim 1, wherein propagating the secondary crypto-agile root certificate comprises propagating the secondary crypto-agile root certificate to a plurality of first-level intermediate certificate authorities.

7. The method of claim 6, wherein each of the plurality of first-level intermediate certificate authorities propagates the secondary crypto-agile root certificate to one or more second-level intermediate certificate authorities.

8. The method of claim 1, further comprising, after propagating the secondary crypto-agile root certificate:

generating a new root certificate of the certificate authority, the new root certificate comprising:

the second public key of the root certificate authority; and a fourth signature of the root certificate authority generated with the second private key; and propagating the new root certificate to the at least one subordinate entity, wherein propagating the new root certificate causes the primary root certificate and the secondary crypto-agile certificate to be replaced by the new root certificate in the certificate chain.

9. The method of claim 8, wherein the new root certificate is propagated to upgrade the PKI system from the first cryptosystem to the second cryptosystem, and the new root certificate is formatted according to a digital certificate standard.

10. A computer system comprising:

one or more processors; and memory storing instructions that are operable when executed by the one or more processors to perform operations comprising:

accessing a primary root certificate of a root certificate authority of a PKI system, the primary root certificate comprising a first public key based on a first crypto-system and a first signature generated with a private key that corresponds to the first public key;

generating a secondary crypto-agile root certificate of the root certificate authority, the secondary crypto-agile root certificate comprising:

the first public key of the root certificate authority;

a second public key of the root certificate authority based on a second cryptosystem;

a second signature of the root certificate authority generated with a second private key that corresponds to the second public key; and a third signature of the root certificate authority generated with the first private key; and propagating the secondary crypto-agile root certificate to at least one subordinate entity in the PKI system, wherein propagating the secondary crypto-agile root certificate causes the secondary crypto-agile root certificate to be inserted in a certificate chain between the primary root certificate and a certificate of an intermediate certificate authority.

11. The computer system of claim 10, wherein propagating the secondary crypto-agile root certificate comprises notifying the intermediate certificate authority that the secondary crypto-agile root certificate is available.

12. The computer system of claim 11, wherein the propagating further comprises:

responsive to a request from the intermediate certificate authority, generating a secondary crypto-agile certificate of the intermediate certificate authority, the secondary crypto-agile certificate of the intermediate certificate authority comprising:

a first public key of the intermediate certificate authority based on the first cryptosystem;

a second public key of the intermediate certificate authority based on the second cryptosystem;

a first signature generated with the first private key of the root certificate authority; and a second signature generated with the second private key of the root certificate authority; and sending the secondary crypto-agile certificate of the intermediate certificate authority to the intermediate certificate authority.

13. The computer system of claim 11, wherein the intermediate certificate authority is a first-level intermediate certificate authority, and propagating the secondary crypto-agile root certificate comprises propagating the secondary crypto-agile root certificate to a plurality of intermediate certificate authorities and a plurality of end entities.

14. The computer system of claim 13, wherein the plurality of certificate authorities comprises the first-level intermediate certificate authority and a second-level intermediate certificate authority.

15. The computer system of claim 10, wherein propagating the secondary crypto-agile root certificate comprises propagating the secondary crypto-agile root certificate to a plurality of first-level intermediate certificate authorities.

16. The computer system of claim 10, the operations further comprising, after propagating the secondary crypto-agile root certificate:

generating a new root certificate of the certificate authority, the new root certificate comprising:

the second public key of the root certificate authority; and a fourth signature of the root certificate authority generated with the second private key; and propagating the new root certificate to the at least one subordinate entity, wherein propagating the new root certificate causes the primary root certificate and the secondary crypto-agile certificate to be replaced by the new root certificate in the certificate chain.

17. A non-transitory computer-readable medium comprising instructions that, when executed by data processing apparatus of a computer system, perform operations comprising:

accessing a primary root certificate of a root certificate authority of a PKI system, the primary root certificate comprising a first public key based on a first crypto-system and a first signature generated with a private key that corresponds to the first public key;

generating a secondary crypto-agile root certificate of the root certificate authority, the secondary crypto-agile root certificate comprising:

the first public key of the root certificate authority;

a second public key of the root certificate authority based on a second cryptosystem;

a second signature of the root certificate authority generated with a second private key that corresponds to the second public key; and a third signature of the root certificate authority generated with the first private key; and propagating the secondary crypto-agile root certificate to at least one subordinate entity in the PKI system, wherein propagating the secondary crypto-agile root certificate causes the secondary crypto-agile root certificate to be inserted in a certificate chain between the primary root certificate and a certificate of an intermediate certificate authority.

18. The non-transitory computer readable medium of claim 17, wherein propagating the secondary crypto-agile root certificate comprises notifying the intermediate certificate authority that the secondary crypto-agile root certificate is available.

19. The non-transitory computer readable medium of claim 18, wherein the propagating further comprises:

responsive to a request from the intermediate certificate authority, generating a secondary crypto-agile certificate of the intermediate certificate authority, the secondary crypto-agile certificate of the intermediate certificate authority comprising:

a first public key of the intermediate certificate authority based on the first cryptosystem;

a second public key of the intermediate certificate authority based on the second cryptosystem;

a first signature generated with the first private key of the root certificate authority; and a second signature generated with the second private key of the root certificate authority; and sending the secondary crypto-agile certificate of the intermediate certificate authority to the intermediate certificate authority.

20. The non-transitory computer readable medium of claim 18, wherein the intermediate certificate authority is a first-level intermediate certificate authority, and propagating the secondary crypto-agile root certificate comprises propagating the secondary crypto-agile root certificate to a plurality of intermediate certificate authorities and a plurality of end entities.

* * * * *